(12) United States Patent
Mikami

(10) Patent No.: US 8,003,582 B2
(45) Date of Patent: Aug. 23, 2011

(54) GREASE, ROLLING BEARING, CONSTANT VELOCITY JOINT, AND ROLLING PARTS

(75) Inventor: Hidenobu Mikami, Kuwana (JP)

(73) Assignee: NTN Corporation, Osaka (JP)

( * ) Notice: Subject to any disclaimer, the term of this patent is extended or adjusted under 35 U.S.C. 154(b) by 29 days.

(21) Appl. No.: 10/587,550

(22) PCT Filed: Feb. 9, 2005

(86) PCT No.: PCT/JP2005/001930
§ 371 (c)(1),
(2), (4) Date: Aug. 31, 2006

(87) PCT Pub. No.: WO2005/075610
PCT Pub. Date: Aug. 18, 2005

(65) Prior Publication Data
US 2007/0154128 A1    Jul. 5, 2007

(30) Foreign Application Priority Data

| Feb. 9, 2004 | (JP) | ............... | P2004-032187 |
| Apr. 8, 2004 | (JP) | ............... | P2004-114620 |
| Jun. 25, 2004 | (JP) | ............... | P2004-187243 |
| Aug. 10, 2004 | (JP) | ............... | P2004-232967 |
| Aug. 10, 2004 | (JP) | ............... | P2004-232968 |
| Sep. 27, 2004 | (JP) | ............... | P2004-278925 |
| Nov. 29, 2004 | (JP) | ............... | P2004-343721 |
| Dec. 6, 2004 | (JP) | ............... | P2004-352310 |
| Jan. 18, 2005 | (JP) | ............... | P2005-010906 |

(51) Int. Cl.
*C10M 125/00* (2006.01)

(52) U.S. Cl. ..................... 508/165; 508/110; 508/154

(58) Field of Classification Search .................. 508/165, 508/180, 591, 597, 551, 627, 154
See application file for complete search history.

(56) References Cited

U.S. PATENT DOCUMENTS
4,256,591 A * 3/1981 Yamamoto et al. ........... 508/258
(Continued)

FOREIGN PATENT DOCUMENTS
DE    32700974 A1    7/1987
(Continued)

OTHER PUBLICATIONS
Lubrication, (1998) vol. 10, No. 2, pp. 171-176.
(Continued)

*Primary Examiner* — Glenn A Caldarola
*Assistant Examiner* — Taiwo Oladapo
(74) *Attorney, Agent, or Firm* — Hedman & Costigan, P.C.; James V. Costigan

(57) ABSTRACT

The present invention provides grease which prevents frictional wear on a lubricating surface and excellent in performance of preventing occurrence of flaking, heat-resistant performance, and long-term durability, a grease-enclosed rolling bearing, a constant velocity joint, and rolling parts. Grease is composed of base grease, essentially containing a thickener, to which at least 0.01 to 15 wt % of one substance selected from among bismuth and inorganic bismuth compounds is added. The inorganic bismuth compounds are at least one inorganic bismuth selected from among bismuth sulfate, bismuth trioxide, bismuth carbonate, and sodium bismuthate. The above-described grease is used for the rolling bearing and the constant velocity joint. A coating film of at least one substance selected from among the bismuth and the inorganic bismuth is formed on surfaces of the rolling parts.

3 Claims, 20 Drawing Sheets

U.S. PATENT DOCUMENTS

| | | | |
|---|---|---|---|
| 4,840,740 A | 6/1989 | Sato et al. | |
| 5,536,424 A * | 7/1996 | Delfort et al. | 508/401 |
| 5,773,394 A | 6/1998 | Wan et al. | |
| 5,962,378 A * | 10/1999 | Tiffany et al. | 508/293 |
| 6,020,290 A * | 2/2000 | Takata et al. | 508/364 |
| 6,090,755 A | 7/2000 | Wan et al. | |
| 6,429,175 B1 * | 8/2002 | Stuart et al. | 508/144 |
| 7,312,185 B2 * | 12/2007 | Willey et al. | 508/165 |
| 2001/0002939 A1 | 6/2001 | Aizawa et al. | |
| 2004/0092408 A1 * | 5/2004 | Willey et al. | 508/165 |

FOREIGN PATENT DOCUMENTS

| | | |
|---|---|---|
| EP | 0 795 598 A1 | 9/1997 |
| FR | 2 592 891 | 7/1987 |
| GB | 2 185 492 A | 7/1987 |
| JP | 51-40279 | 11/1976 |
| JP | 59081394 A * | 5/1984 |
| JP | 61-012791 | 1/1986 |
| JP | 61-167180 | 7/1986 |
| JP | 61-201782 | 9/1986 |
| JP | 63-046299 | 2/1988 |
| JP | 02-256920 | 10/1990 |
| JP | 08-041478 | 2/1996 |
| JP | 10-017884 | 1/1998 |
| JP | 10-030096 | 2/1998 |
| JP | 10-0300096 | 2/1998 |
| JP | 10-183161 | 7/1998 |
| JP | 10-324885 | 12/1998 |
| JP | 11-22732 | 1/1999 |
| JP | 11-030236 | 2/1999 |
| JP | 2001-221243 | 8/2001 |
| JP | 2001-247888 | 9/2001 |
| JP | 2002-20780 | 1/2002 |
| JP | 2003-214321 | 7/2003 |
| JP | 2003-278637 | 10/2003 |
| JP | 2003-301837 | 10/2003 |
| JP | 2003-343414 | 12/2003 |
| JP | 2004-044477 | 2/2004 |
| JP | 2004-060506 | 2/2004 |
| JP | 2004-068622 | 3/2004 |
| JP | 2004-183531 | 7/2004 |
| JP | 2004-217003 A | 8/2004 |
| JP | 2005-255977 | 9/2005 |
| JP | 2005-298604 | 10/2005 |
| NL | 1002587 | 9/1997 |
| SU | 827538 | 7/1981 |
| SU | 1253990 | 8/1986 |
| WO | WO 03/052268 | 6/2003 |

OTHER PUBLICATIONS

Catalog, The New Generation of Bearings fo Wind Turbines A65. CAT. No. 8404/04/JE, May 1, 2004.

Trenie I Iznos, (1984) vol. 5, No. 5, pp. 882-888.

Trenie I Iznos, (1986) vol. 7, No. 1, pp. 168-172.

* cited by examiner

GREASE, ROLLING BEARING, CONSTANT VELOCITY JOINT, AND ROLLING PARTS

TECHNICAL FIELD

The present invention relates to grease excellent in lubricating properties under a high load and high in withstand load; a rolling bearing and a constant velocity joint in which the grease is enclosed; and rolling parts for use in airplanes, rolling stocks, building machines, auxiliary machines of cars, and hubs of cars.

The rolling bearing relates to the rolling bearing for use in a wheel or a wheel-supporting rolling bearing unit. The rolling bearing for use in the wheel relates to a bearing for use in an axle of the rolling stock, a rolling bearing for use in the rolling stock to be used for a main motor of the rolling stock, a rolling bearing for use in the wheel-supporting apparatus for rotatably supporting wheels of a car when a car is suspended by a suspending apparatus, and a rolling bearing for use in a rolling neck of a rolling machine.

The constant velocity joint relates to a constant velocity joint of a plunging type for use in a car or a constant velocity ball joint of a fixed type for use in a car and a constant velocity joint in which the above-described grease is enclosed.

BACKGROUND ART

Heretofore, when the rolling bearing in which grease is enclosed is used in a high load-applied condition, a lubricating film of lubricating grease is liable to fracture. When the lubricating film fractures, metal contact occurs to generate a disadvantage that heat generation and frictional wear increase. Therefore by using grease containing an extreme-pressure agent (EP agent), the disadvantage is decreased.

As the use condition of the rolling bearing becomes severe, by improving the lubricating properties of grease and the resistance thereof to a load, it is necessary to prevent the occurrence of the metal contact caused by the fracture of the lubricating oil film. A roller bearing has a flange and at a flange portion thereof, a rolling element and a flange of a bearing ring make a sliding motion. Thus at the flange portion, the fracture of the lubricating oil film is liable to occur.

Solid lubricant-containing grease in which for 100 parts by weight of an adduct of melamine (iso) cyanurate, 5 to 1000 parts by weight of a solid lubricant selected from the group of polytetrafluoroethylene, molybdenum disulfide, and molybdenum dithiocarbamate (thereinafter abbreviated as MoDTC) is used is known (patent document 1). An organic bismuth compound-containing an extreme-pressure grease lubricant composition for use in the rolling bearing is also known (patent document 2). Grease containing the MoDTC and polysulfide to decrease wear is also known (patent document 3).

The bearing for use in the rolling stock is classified into the bearing for use in the axle and the bearing for use in the main motor. In the case of the bearing for use in the axle, both end portions of the axle is supported by a tapered roller bearing mounted on an underframe of the rolling stock. In the case of the bearing for use in the main motor, both output-side end portions of the rotary shaft of the motor are supported by a cylindrical roller bearing or a ball bearing mounted on the underframe of the rolling stock.

In a wheel-supporting apparatus supporting a non-driven wheel such as a front wheel of a rear wheel-driving type vehicle, two rolling bearings are mounted on an axle (knuckle spindle) provided on a steering knuckle, a flange is provided on an outside-diameter surface of an axle hub rotatably supported by the rolling bearings, and a braking drum of a braking apparatus and a wheel disk of the wheel are mounted, with stud bolts provided on the flange and with nuts engaging the stud bolts with screws.

A back plate is mounted on the flange provided on the steering knuckle so that the back plate supports a braking mechanism for imparting a braking force to the braking drum.

In the above-described wheel-supporting apparatus, as the rolling bearing rotatably supporting the axle hub, a tapered roller bearing having a high load capacity and a high rigidity is used. The tapered roller bearing is lubricated with grease enclosed between the axle and the axle hub.

As an example of the bearing for use in the rolling stock and the wheel-supporting apparatus to which a high load is applied at a high-speed operation, a bearing for use in the rolling stock in which grease containing not more than 20 wt % of an organic metal compound containing metal selected from among nickel, tellurium, selenium, copper, and iron for the entire amount of the grease is enclosed is known (patent document 4).

In a rolling neck bearing for use in a rolling machine, generally, an inner ring thereof has one double row inner ring, and an outer ring has one double row outer ring and two single row outer rings disposed at both ends of the double row outer ring via a spacer. Rolling elements are circumferentially rotatably disposed in four rows between the inner ring and the outer ring. An annular seal member is mounted on both end portions of the outer ring.

The rolling neck bearing for use in the rolling machine is used in a rolling process of a steel-manufacturing factory in an environment in which a rolling liquid containing water as its main component is jetted. Thus there is a problem that when water penetrates into the bearing, a lubricating oil film is fractured and the bearing is damaged at an early stage owing to inferior lubrication.

To cope with this problem, an example of the rolling neck bearing having the following construction is known: An annular seal member is mounted at both end portions of the outer ring, with a seal lip portion thereof in contact with the peripheral surface of the inner ring. An intermediate seal member is mounted at an inner peripheral side of a butted end of one double row inner ring. By forming a slit for a vent mechanism on the intermediate seal member, even though air inside the bearing expands or contracts owing a change of temperature, the difference between a pressure inside the bearing and a pressure outside the bearing is automatically balanced to prevent the water from penetrating into the bearing (patent document 5).

However, the rolling bearing having the above-described construction is used as the rolling neck bearing for use in the rolling machine, the seal lip portion of the annular seal member mounted on the outer ring at both axial ends thereof is of a type which makes a line contact with the peripheral surface of the inner ring. Thus in an environment in which the rolling roller is frequently mounted and removed for re-grinding, the seal lip portion is much damaged. Consequently rolling water and cooling water penetrate into the bearing at a rate of not more than 20% of the grease and mix with a lubricant (normally, grease lubricant in which lithium-based thickener such as Adlex, Albania or the like is used), thus deteriorating the lubricating function thereof and causing the bearing to be damaged in an early stage owing to inferior lubrication.

Regarding the rolling bearing unit for supporting the wheel of a car, a rolling bearing of a first example having the construction in which the inner ring is set as the stationary-side bearing ring and the hub is set as the rotational-side bearing ring is known. A rolling bearing of a second example having the construction in which the outer ring is set as the stationary-side bearing ring and the hub is set as the rotational-side bearing ring is known (patent document 6).

The first example of the conventional construction of the wheel-supporting rolling bearing unit is described below with reference to FIG. 12. FIG. 12 is a sectional view showing the first example of the conventional construction of the wheel-supporting rolling bearing unit. The wheel 1 is rotatably supported by the wheel-supporting rolling bearing unit 2 as shown in FIG. 12 at the end portion of the shaft 3 constructing the suspending construction. That is, the inner rings 5, 5, set as the stationary-side bearing ring, which construct the wheel-supporting rolling bearing unit 2 are fitted on the axle 4 fixed to the end portion of the shaft 3 and fixed thereto with the nut 6. The wheel 1 is fixedly connected to the hub 7, set as the rotational-side bearing ring, which constructs the wheel-supporting rolling bearing unit 2 with a plurality of the studs 8, 8 and the nuts 9, 9.

The double row outer ring rolling surfaces 10a, 10b each serving as the rotational-side rolling surface are formed on the inner peripheral surface of the hub 7, and the mounting flange 11 is formed on the peripheral surface thereof. The wheel 1 and the drum 12 for constructing the braking apparatus are fixedly connected to one side surface (outer side surface in the illustrated example) of the mounting flange 11 with the studs 8, 8 and the nuts 9, 9.

In the specification, "outside" in the axial direction means the outer side in the widthwise direction in a state in which the bearing unit is mounted on a vehicle, whereas "inside" means the central side in the widthwise direction.

Between the outer ring rolling surfaces 10a, 10b and between the inner ring rolling surfaces 13a, 13b formed on the peripheral surfaces of the inner rings 5, 5 as the stationary-side rolling surfaces, a plurality of the balls 14, 14 which are the rolling elements respectively are rotatably provided, with the balls 14, 14 held by the cages 15, 15 respectively. By combining the constituent members with one another in this manner, a double row ball bearing of an angular type is constructed in a back-to-back arrangement, and the hub 7 is rotatably supported on the periphery of each of the inner rings 5, 5, and a radial load and a thrust load are freely supported. The seal rings 16a, 16b are provided between the inner peripheral surfaces of both end portions of the hub 7 and the peripheral surface of the end portion of each of the inner rings 5, 5 to disconnect the space in which the balls 14, 14 are provided and the inner space 17 from each other.

The open portion at the outer end of the hub 7 is closed with the cap 18.

When the above-described wheel-supporting rolling bearing unit 2 is used, as shown in FIG. 12, the axle 4 on which the inner rings 5, 5 are fixedly fitted is fixed to the shaft 3, and the wheel 1 and the drum 12 with which an unshown tire is combined are fixed to the mounting flange 11 of the hub 7. The drum 12, and an unshown wheel cylinder and an unshown shoe both supported by the backing plate 19 fixed to the end portion of the shaft 3 are combined with one another to construct the drum brake for braking use. At a braking time, a pair of shoes provided at an inside-diameter side of the drum 12 is pressed against the inner peripheral surface of the drum 12. Grease is enclosed inside the inner space 17 to lubricate the rolling contact portion among the outer ring rolling surfaces 10a, 10b, the inner ring rolling surfaces 13a, 13b, and the rolling surfaces of the balls 14, 14.

The second example of the conventional construction of the wheel-supporting rolling bearing unit is described below with reference to FIG. 13. FIG. 13 is a sectional view showing the second example of the conventional construction of the wheel-supporting rolling bearing unit. In the case of the wheel-supporting rolling bearing unit 2a shown in FIG. 13, the hub 7a serving as the rotational-side bearing ring is rotatably supported by a plurality of the balls 14, 14 each serving as the rolling element at the inside-diameter side of the outer ring 20 serving as the stationary-side bearing ring. To do so, the double row outer ring rolling surfaces 10a, 10b each serving as the stationary-side rolling surface are formed on the inner peripheral surface of the outer ring 20, and the first and second inner ring rolling surfaces 21, 22 each serving as the rotational-side rolling surface are formed on the peripheral surface of the hub 7a. The hub 7a is constructed in combination of the hub body 23 and the inner ring 24. The mounting flange 11a for supporting the wheel is provided at the outer end of the peripheral surface of the hub body 23. The first inner ring rolling surface 21 is formed at the intermediate portion of the hub body 23. The small-diameter stepped portion 25 whose diameter is smaller than that of the portion where the first inner ring rolling surface 21 is formed is provided at the portion near the inner end of the intermediate portion of the hub body 23. The inner ring 24 having the sectionally circular arc-shaped second inner ring rolling surface 22 formed on the peripheral surface thereof is fitted on the small-diameter stepped portion 25. Further the inner end surface of the inner ring 24 is held down by the caulking portion 26 formed by plastically deforming the inner end portion of the hub body 23 radially outward to fix the inner ring 24 to the hub body 23.

Seal rings 16c, 16d are provided between the inner peripheral surfaces of both end portions of the outer ring 20 and the peripheral surface of the intermediate portion of the hub body 23 as well as the peripheral surface of the inner end portion of the inner ring 24 to disconnect the inner space 17a in which the balls 14, 14 are provided and the outer space from each other between the inner peripheral surface of the outer ring 20 and the peripheral surface of the hub 7a.

Grease is enclosed in the inner space 17a to lubricate the rolling contact portion among the outer ring rolling surfaces 10a, 10b, the inner ring rolling surfaces 21, 22, and the rolling surfaces of the balls 14, 14.

In the lubrication of the rolling bearing portion, to prevent the lubricating film of the lubricating grease from being fractured, the grease containing the extreme-pressure agent (EP agent) is used to reduce the fracture of the lubricating oil film.

For example, the extreme-pressure grease lubricant composition containing the organic bismuth compound for use in the rolling bearing is known (patent document 2). The grease containing the MoDTC and polysulfide to reduce wear is also known (patent document 3).

It cannot be said that the constant velocity joint is satisfactory in a severe operation condition generated in recent high-performance cars. Any of the constant velocity joint of a double off-set type, the constant velocity joint of a cross groove type, and the like used as the constant velocity joint of the plunging type and a bar field joint used as the constant velocity ball joint of a stationary type has a construction of transmitting a torque by means of several balls. In these constant velocity joints, owing to a reciprocating motion of complicated rolling and sliding under a high surface pressure during rotations thereof, a stress is repeatedly applied to balls and metal surfaces that contact the balls. Thus a flaking phenomenon is liable to occur owing to metal fatigue. Because a car is lightweight in recent years so that an engine is capable of producing a high output and fuel expenses can be decreased, the constant velocity joint is small-sized. Thus the constant velocity joint is subjected to a relatively high surface pressure. Consequently the conventional grease is incapable of sufficiently preventing the occurrence of the flaking phenomenon. Further it is necessary to improve the heat resistance of the grease.

Heretofore to prevent the fracture of the lubricating film of the lubricating grease, the extreme-pressure agent (EP agent)-containing grease is used for the above-described grease for use in the constant velocity joint to decrease the fracture of the lubricating oil film of the lubricating grease.

For example, the grease (patent document 7) obtained by mixing an organic molybdenum compound with urea-based grease and the grease (patent document 8) obtained by mixing molybdenum disulfide, the MoDTC, and a sulfur-containing organic tin compound with the urea-based grease are known.

Because the rolling bearing and the constant velocity joint are used in a severe condition of a high speed and under a high load, the flange of the bearing ring makes a sliding motion on the large end face of the roller and the flange portion thereof. Thus the lubricating oil film of the lubricating grease is liable to fracture. Owing to the fracture of the lubricating oil film, metal contact occurs to generate a disadvantage that heat generation and frictional wear increase.

Therefore by improving the lubricating properties of the grease and the withstand load at a high speed and under a high load, it is necessary to prevent the occurrence of the metal contact caused by the fracture of the lubricating oil film. Thus by using the extreme-pressure agent-containing grease, its disadvantage is decreased.

The rolling bearing and the constant velocity joint are subjected to rolling friction between the rolling surface of the inner ring as well as the rolling surface of the outer ring and a "roller" which is a rolling element and subjected to sliding friction between the flange portion and the "roller". Because the sliding friction is larger than the rolling friction, seizing of the flange portion is liable to occur when the use condition becomes severe. Therefore the conventional rolling bearing and the conventional constant velocity joint have a problem respectively that they cause a grease-exchanging work to be frequently performed and are incapable of making maintenance free.

Further as the use condition of the rolling bearing and that the constant velocity joint become severe, for example, when they are lubricated at a high speed of not less than 100,000 in dN value, the conventional grease is incapable of preventing the occurrence of the flaking phenomenon sufficiently. Thus it is difficult to use the constant velocity joint.

In the case of the conventional rolling parts and the rolling bearing, when the grease-enclosed rolling bearing is used under a high load, the lubricating oil film of the lubricating grease is liable to fracture. When the lubricating oil film has fractured, metal contact occurs to generate a disadvantage that heat generation and frictional wear increase. Thus the grease containing the extreme-pressure agent (EP agent) is used to reduce the disadvantage of the lubricating oil film.

To provide a sliding member or a rolling member and a rolling bearing having a low friction, a low wear, and sufficiently improved withstand load and seizing, base grease is allowed to chemically react with at least one of an organic phosphor compound, an organic sulfur compound, an organic chlorine compound, and an organic metal compound. Thereby the sliding member or the rolling member having a film layer formed by the reaction of compounds in a thickness of 0.05 to 0.5 µm as a result of the chemical reaction is obtained (patent document 9).

To improve the frictional characteristics of rolling parts in a boundary lubrication condition so that the rolling parts have little variations in the frictional characteristics thereof and have a stable and long life in the bearings thereof, a rolling part on which a coating film of metal salts of thiophosfate is formed is known (patent document 10).

But these rolling parts have a problem that they are insufficient in wear-decreasing effect on sliding surfaces thereof and lack long-term durability in the use condition of a high temperature and a high speed.

In the grease-enclosed rolling bearing, as the use condition of the rolling bearing becomes severe, it is necessary to prevent the occurrence of the metal contact caused by the fracture of the lubricating oil film by improving the lubricating properties of grease and the resistance thereof to a load. The roller bearing has in particular the flange, and at the flange portion, the rolling element and the flange of the bearing ring make a sliding motion respectively. Thus the grease-enclosed rolling bearing has a problem that at the flange portion, the fracture of the lubricating oil film is liable to occur.

Patent document 1: Japanese Patent Application Laid-Open No.61-12791

Patent document 2: Japanese Patent Application Laid-Open No.8-41478

Patent document 3: Japanese Patent Application Laid-Open No.10-324885

Patent document 4: Japanese Patent Application Laid-Open No.10-17884

Patent document 5: Japanese Patent Application Laid-Open No.2000-104747

Patent document 6: Japanese Patent Application Laid-Open No.2001-221243

Patent document 7: Japanese Patent Application Laid-Open No.63-46299

Patent document 8: Japanese Patent Application Laid-Open No.10-183161

Patent document 9: Japanese Patent Application Laid-Open No.2-256920

Patent document 10: Japanese Patent Application Laid-Open No.11-30236

DISCLOSURE OF THE INVENTION

Problems to Be Solved By the Invention

The problem to be solved by the invention is to provide grease which prevents frictional wear on a lubricating surface in a state in which a rolling sliding motion is generated at a high speed and under a high load and is excellent in the performance of preventing the occurrence of flaking and in heat-resistant performance and long-term durability, a grease-enclosed rolling bearing, a grease-enclosed constant velocity joint, and rolling parts.

Means for Solving the Problems

A grease of the present invention is composed of a base grease and an additive, wherein the base grease comprises a base oil and a thickener, and the additive comprises a substance selected from among bismuth and inorganic bismuth compounds ("inorganic bismuth compound" is hereinafter referred to as "inorganic bismuth").

0.01 to 15 wt % of at least one substance selected from the bismuth and the inorganic bismuth is added to a total amount of the base grease and the additive.

The bismuth is bismuth powder.

The inorganic bismuth is one inorganic bismuth selected from among bismuth sulfate, bismuth trioxide, bismuth carbonate, and sodium bismuthate.

The base oil is at least one oil selected from among poly-α-olefin oil, mineral oil, ester oil, and ether oil.

The base oil has a kinematic viscosity of 20 to 200 mm²/s at 40° C.

The thickener is at least one compound selected from among urea-based compounds and lithium soap.

A rolling bearing of the present invention has an inner ring, an outer ring, a plurality of rolling elements interposed between the inner ring and the outer ring, and the above-described grease is applied to a periphery of the rolling elements.

In a constant velocity joint of the present invention, a rotational torque is transmitted by engagement between a track groove and a rolling element, and by rolling of the rolling element along the track groove, an axial movement thereof is performed, and the above-described grease is enclosed in the constant velocity joint.

A rolling part of the present invention has a coating film of one substance selected from among bismuth and inorganic bismuth formed on a surface thereof and is used in contact with the above-described grease.

Effect of the Invention

At least one substance selected from among the bismuth and the inorganic bismuth excellent in the resistance to heat and durability thereof is used for the grease, grease-enclosed rolling bearing, constant velocity joint, and rolling parts of the present invention. Therefore the substance supplied to a sliding interface forms a coating film, thus allowing the extreme-pressure property effect to continue for a long time. Therefore in the state in which rolling and sliding motions are generated at a high speed and under a high load, frictional wear on the lubricating surface is prevented, and the grease, grease-enclosed rolling bearing, constant velocity joint, and rolling parts of the present invention can be preferably utilized for rolling stocks, building machines, electric auxiliary machines of cars, and the like demanded to prevent the occurrence of flaking, have heat-resistant performance and long-term durability.

EXPLANATION OF REFERENCE NUMERALS AND SYMBOLS

Figure 1:
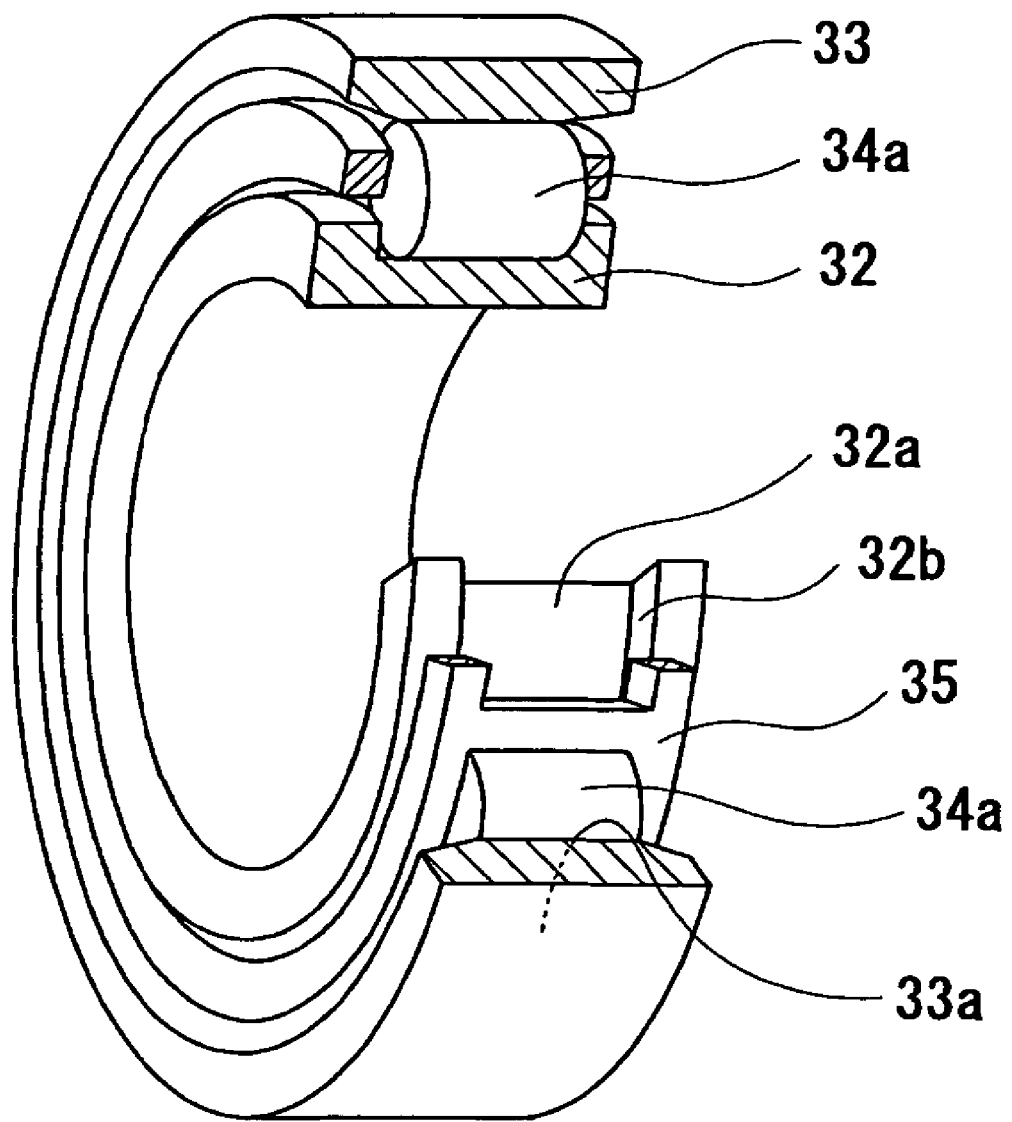
FIG. 1 is a partly cut-out perspective view of a roller bearing.

1: wheel
2: wheel-supporting rolling bearing unit
3: shaft
4: axle
5: inner ring
6: nut
7: hub
8: stud
9: nut
10: outer ring rolling surface
11: mounting flange
12: drum
13: inner ring rolling surface
14: ball
15: cage
16: seal ring
17: inner space
18: cap
19: backing plate
20: outer ring
21: inner ring rolling surface
22: inner ring rolling surface
23: hub body
24: inner ring
25: small-diameter stepped portion
26: caulking portion
27: external thread portion
28: nut
29: spline hole
31: grease-enclosed bearing
32: inner ring
33: outer ring
34: rolling element
35: cage
36: seal member
37: grease
38: open portion at both axial ends
41: rotary shaft
42: ring-shaped specimen
43: ring-shaped specimen
44: end surface
51: tapered roller bearing
52: inner ring
53: outer ring
54: tapered roller
55: axle
56: inner ring spacer
57: injection hole 61: tapered roller bearing
62: steering knuckle
63: flange
64: axle
65: axle hub
66: flange
67: stud bolt
68: nut
69: braking drum
70: wheel disk
71: rim
72: back plate
73: grease cap
81: tapered roller bearing
82: inner ring
83: inner ring rolling surface
84: outer ring
85: outer ring rolling surface
86: tapered roller
87: cage
88: seal member
89: large flange
90: seal case
91: annular groove
92: contact-type oil seal
101: inner ring
102: outer ring
103: track groove
104: track groove
105: ball
106: cage
107: spherical surface
108: spherical surface
109: shaft
110: boot
111: grease for use in constant velocity joint
112: outer ring
113: track groove
114: tri-port member
115: leg-like shaft
116: spherical roller
117: needle
121: wind power generator
122: blade
123: main shaft
124: nacelle
125: bearing
126: speed-up gear
127: generator
128: supporting base
129: motor
130: reduction gear
131: inner ring
132: outer ring
133: rolling element
134: cage
135: bearing housing
136: seal
140: swing bearing

BEST MODE FOR CARRYING OUT THE INVENTION

As a result of investigation of improvement of the lubricating property and withstand load of a bearing in a state in which rolling and sliding motions are generated at a high speed and under a high load, it has been found that a rolling bearing, a constant velocity joint, and rolling parts composed of grease containing 0.01 to 15 wt % of bismuth or inorganic bismuth used for the entire grease as an additive are worn to a lower extent and have a higher long-term durability under a high load and in a sliding motion than a rolling bearing, a constant velocity joint, and rolling parts composed of grease containing an additive other than the bismuth or the inorganic bismuth. It has been also found that rolling bearings using the above-described bearing for use in wheels such as a rolling bearing for use in a rolling stock, a rolling bearing for use in a wheel-supporting apparatus, a rolling bearing for use in a rolling neck of a rolling machine, and a wheel-supporting rolling bearing unit using the above-described bearing are worn to a lower extent and have a higher long-term durability under a high load and in a sliding motion.

This is because a coating film consisting of the bismuth, the inorganic bismuth or the like is superior to other substances in the heat resistance and durability thereof and is less heat-decomposable than the other substances. Thus it is considered that they are capable of keeping an extreme-pressure property effect for a long time. The present invention is based on the above-described finding.

It is essential to add the bismuth or the inorganic bismuth to the grease of the present invention as an extreme-pressure agent. One kind of the bismuth or the inorganic bismuth may be added to the grease or two kinds thereof may be mixed with each other to add a mixture to the grease. The addition amount of the bismuth or the inorganic bismuth is set to 0.01 to 15 wt % for the entire grease and preferably 1 to 10 wt %. When the addition amount thereof is less than 0.01 wt %, the effect of improving the wear resistance cannot be displayed. When the addition amount thereof is more than 15 wt %, a torque at the time of a rotation becomes large, and thus heat generation increases and the rotation is interfered.

As the bismuth or the inorganic bismuth that can be used for the grease of the present invention, bismuth (powder), bismuth carbonate, bismuth chloride, bismuth nitrate, and hydrates thereof, bismuth sulfate, bismuth fluoride, bismuth bromide, bismuth iodide, bismuth oxyfluoride, bismuth oxychloride, bismuth oxybromide, bismuth oxyiodide, bismuth oxide, and hydrates thereof, bismuth hydroxide, bismuth selenide, bismuth telluride, bismuth phosphate, bismuth oxyperchlorate, bismuth oxysulfate, sodium bismuthate, bismuth titanate, bismuth zirconate, and bismuth molybdate are listed. In the present invention, the bismuth powder, the bismuth sulfate, and bismuth trioxide are favorable because these substances are excellent in resistance to heat and durability and less heat-decomposable than other substances and thus have a high extreme-pressure property effect. The bismuth powder and the bismuth trioxide or mixtures thereof are particularly favorable.

The bismuth is a silver white metal, has the lowest heat conductivity of all metals except mercury, has a specific gravity of 9.8, and a melting point of 271.3° C. The bismuth powder is a comparatively soft metal and becomes easily filmy when it is subjected to an extreme pressure. Therefore the diameter of the bismuth powder should be so set that it is capable of dispersing in the grease. It is preferable that the bismuth powder for use in the grease of the present invention to be enclosed in the bearing for use in the rolling stock has a diameter of 5 to 500 μm.

It is essential to add the bismuth or the inorganic bismuth to the grease for use in the rolling bearing, the constant velocity joint, and the rolling parts of the present invention as the extreme-pressure agent thereof. One kind of the bismuth or the inorganic bismuth may be added to the grease or two kinds thereof may be mixed with each other to add a mixture to the grease.

The addition amount of the bismuth or the inorganic bismuth is set to 0.01 to 15 wt % for the entire grease and preferably 1 to 10 wt %. When the addition amount thereof is less than 0.01 wt %, the effect of improving the wear resistance cannot be displayed. When the addition amount thereof is more than 15 wt %, the torque at the time of a rotation becomes large, and thus heat generation increases, and the rotation is interfered.

As the base oil that can be used for the grease of the present invention, mineral oil, PAO oil, ester oil, phenyl ether oil, fluorine oil, and hydrocarbon oil (GTL base oil) synthesized by Fischer-Tropsch reaction are listed. Of these oils, it is preferable to use at least one base oil selected from among the PAO oil and the mineral oil. Normally the above-described PAO oil is oligomers of α-olefin or isomerized α-olefin or mixtures of polymers. As examples of the α-olefin, it is possible to list 1-octane, 1-nonen, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, 1-tetracosene, and the like. Normally mixtures of these substances are used. As the mineral oil, it is possible to use any of normal lubricants such as paraffin mineral oil, naphthene mineral oil, and the like and those used in the field of grease.

It is preferable that the base oil which can be used for the grease to be enclosed in the rolling bearing of the present invention has a kinematic viscosity of 20 to 200 mm²/s at 40° C. It is not preferable that the base oil has a kinematic viscosity less than 20 mm²/s because the evaporation loss thereof increases and resistance thereof to heat deteriorates. It is not preferable that the kinematic viscosity of the base oil exceeds 200 mm²/s because the temperature of the bearing rises greatly owing to an increase of the rotational torque.

It is preferable that the base oil which can be used for the grease to be enclosed in the rolling bearing of the present invention for use in a wheel and a wheel-supporting rolling bearing unit has a kinematic viscosity of 30 to 200 mm²/s at 40° C. It is not preferable that the base oil has a kinematic viscosity less than 30 mm²/s because the evaporation loss thereof increases and resistance thereof to heat deteriorates. It is not preferable that the kinematic viscosity of the base oil exceeds 200 mm²/s because the temperature of the bearing rises greatly owing to the increase of the rotational torque.

It is preferable that the base oil which can be used for the grease to be enclosed in the constant velocity joint of the present invention has a kinematic viscosity of 30 to 500 mm²/s at 40° C. It is not preferable that the base oil has a kinematic viscosity less than 30 mm²/s because the evaporation loss thereof increases and resistance thereof to heat deteriorates. It is not preferable that the kinematic viscosity of the base oil exceeds 500 mm²/s because the temperature of the bearing rises greatly owing to the increase of the rotational torque.

As a thickener that can be used for the grease of the present invention, it is possible to use aluminum, lithium, sodium, metallic soap-based thickeners such as composite lithium, composite calcium, and composite aluminum; and diurea compounds shown by a formula (1) shown below. The diurea compounds are favorable. These thickeners may be used singly or in combination of two or more thereof.

[Chemical formula 1]

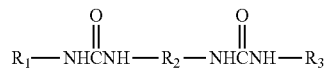

(1)

$R_2$ in the formula (1) indicates an aromatic hydrocarbon radical having carbon atoms of 6 to 15. $R_1$ and $R_3$ indicate an aromatic hydrocarbon group having carbon atoms of 6 to 12, an alicyclic hydrocarbon group having carbon atoms of 6 to 20 or an aliphatic hydrocarbon group having carbon atoms of 6 to 20. $R_1$ and $R_3$ may be identical to or different from each other.

The urea-based compound indicated by the formula (1) is obtained by a reaction of diisocyanate and monoamine. As the diisocyanate, phenylene diisocyanate, diphenyl diisocyanate, diphenylmethane diisocyanate, 1,5-naphthylene diisocyanate, 2,4-trilene diisocyanate, 3,3-dimethyl-4,4-biphenylene diisocyanate, octadecane diisocyanate, decane diisocyanate, hexane diisocyanate, and the like are listed. As the monoamine, octyl amine, dodecyl amine, hexadecyl amine, stearyl amine, oleyl amine, aniline, p-toluidine, cyclohexyl amine, and the like are listed.

The urea compound is obtained by a reaction between an isocyanate compound and an amine compound. To prevent a reactive free radical from remaining, it is preferable to use the isocyanate group of the isocyanate compound and the amino group of the amine compound in an equivalent weight.

By mixing the urea compound with the base oil, base grease to which various compounding agents are to be added is obtained. The base grease is formed by reacting the isocyanate compound and the amine compound with each other in the base oil.

In addition to the urea compound, polyurea compounds can be used.

It is preferable that the mixing consistency of the grease, which can be used in the present invention, for use in the rolling bearing and the constant velocity joint is in the range from 160 to 400. When the mixing consistency is less than 160, the lubricating performance at a low temperature is low. When the mixing consistency exceeds 400, the grease is liable to leak. Thus it is not preferable that the mixing consistency is less than 160 and more than 400.

In the present invention, it is possible to use the rolling bearing to which lubricating oil or a lubricant such as lubricating grease is applied or in which the lubricating oil or the lubricant is enclosed. The above-described lubricant is not limited to a specific kind, but lubricants that are normally used for the rolling bearing can be used. The rolling bearing of the present invention can be used even in a state in which no lubricant is used therefor.

Known additives can be contained in the grease of the present invention. As the additives, it is possible to list organic zinc compounds; antioxidants such as amine-based antioxidant, phenol-based antioxidant, sulfur-based antioxidant; metal inert agents such as benzotriazole, sodium nitride, and the like; viscosity index-improving agents such as polymethacrylate, polystyrene, and the like; and solid lubricants such as molybdenum disulfide, graphite, and the like. These additives can be added to the grease singly or in combination of two or more thereof.

In the grease of the present invention for use in the constant velocity joint, as the mixing ratio of the additive, it is preferable that 0.01 to 15 parts by weight is used for 100 parts by weight which is the total amount of the base oil and the thickener. When the mixing ratio of the additive is less than 0.01 parts by weight, the effect of the mixing thereof is small. When the mixing ratio of the additive agent is more than 15 parts by weight, heat generation increases. Thus temperature rises.

As the mixing ratio of the base oil, it is preferable that 50 to 95 parts by weight of the base oil is used for 100 parts by weight which is the total amount of the base oil and the thickener. When the mixing ratio of the base oil is less than 50 parts by weight, the amount of the lubricating oil is small and hence inferior lubrication is liable to occur. When the mixing ratio of the base oil exceeds 95 parts by weight, the grease is liable to become soft and hence liable to leak.

The grease of the present invention that can be used for the rolling bearing for use in a wheel, the constant velocity joint, and the rolling parts can be also used for bearings, to which a high load is applied, other than the rolling bearing for use in a wheel, the constant velocity joint, and the rolling parts.

The grease of the present invention for use in the roller bearing is capable of improving the life of the grease-enclosed roller bearing. Therefore the grease of the present invention for use in the roller bearing can be used as grease to be enclosed in a cylindrical roller bearing, a tapered roller bearing, a spherical roller bearing, a needle-shaped roller bearing, a thrust cylindrical roller bearing, a thrust tapered roller bearing, a thrust needle-shaped roller bearing, and a thrust spherical roller bearing, and the like.

To form the coating film of the bismuth or the like on the surface of the bearing member made of metal, after the rolling bearing is immersed in a liquid in which the bismuth or the bismuth compound is dispersed, the bearing is rotated and by using frictional heat generated at that time, the bismuth or the bismuth compound is allowed to react with the surface of the metal. Thereby the coating film of the bismuth or the like can be formed. An active metal surface is formed by friction or the like on the surface of the bearing member made of metal. To form the coating film quickly, it is desirable to form the coating film while the liquid is being warmed.

As other methods of forming the coating film of the bismuth or the like, dry plating such as vacuum evaporation, physical vapor deposition (PVD), chemical vapor deposition (CVD), and ion plating; and wet plating such as electroplating, electroless plating, conversion treatment are listed. In addition, after at least one substance selected from among the bismuth and the bismuth compound is heated to a temperature higher than the melting point thereof, the substance or the substances are applied to the surface of the bearing made of metal on which the coating film is to be formed. Thereby the coating film of the bismuth and the bismuth compound can be also formed.

A roller bearing in which the grease of the present invention that is used therefor is enclosed is described below with reference to FIG. 1. FIG. 1 is a partly cut-out perspective view of the roller bearing. In the roller bearing, a roller 34a is disposed between an inner ring 32 and an outer ring 33 via a cage 35. The roller 34a is subjected to rolling friction between a rolling surface 32a of the inner ring 32 and a rolling surface 33a of the outer ring 33 and sliding friction between flange portions 32b of the inner ring 32. To reduce the rolling friction and the sliding friction, the grease for use in the roller bearing is enclosed therein.

The bearing for the rolling stock includes a bearing for an axle and a bearing for a main motor.

As the bearing for the axle, an RCT bearing is used. In the RCT bearing, because a flange of a bearing ring makes a sliding motion on a large end face of a roller and at a flange portion thereof, the lubricating oil film of the lubricating grease is liable to fracture. When the lubricating oil film has fractured, metal contact occurs to generate a disadvantage that heat generation and frictional wear increase.

As the bearing for the main motor, a cylindrical roller bearing and a ball bearing are used. As described above, in the case of the cylindrical roller bearing, the lubricating oil film of the lubricating grease is liable to fracture on the large end face of the roller and at the flange portion. In the ball bearing, sliding occurs between the rolling element and the cage, and further differential sliding occurs between the rolling element and the bearing ring. Thus the lubricating oil film of the lubricating grease is liable to fracture.

Figure 5:
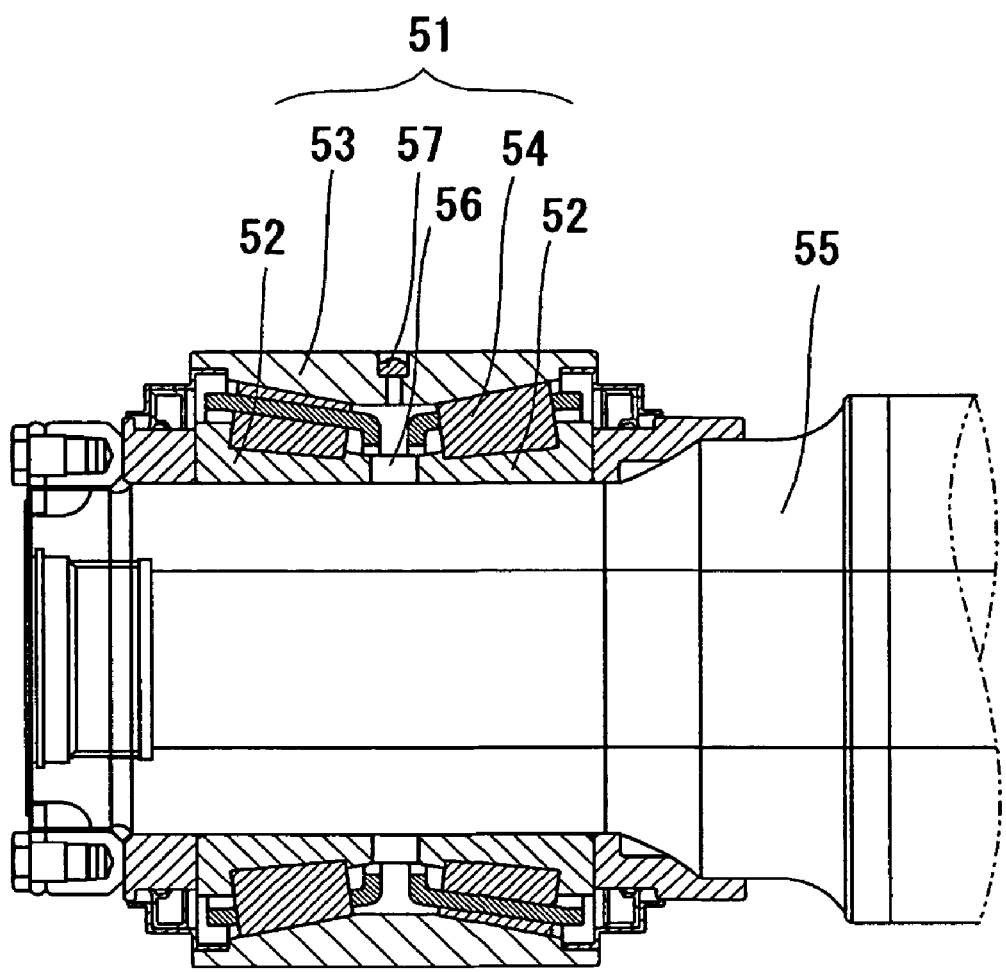
FIG. 5 is a sectional view of a bearing for use in an axle.

The bearing of the present invention for use in the axle of the bearing for use in the rolling stock is described below with reference to FIG. 5. FIG. 5 is a sectional view of the bearing for the axle. Both end portions of an axle 55 are supported by a tapered roller bearing 51 mounted on a frame (not shown) of the rolling stock. The tapered roller bearing 51 includes an inner ring 52, an outer ring 53, a plurality of tapered rollers 54 which are interposed between the inner ring 52 and the outer ring 53 and which rotatably roll, a inner ring spacer 56 interposed between the adjacent inner rings 52, and an injection hole 57 for supplying the grease to the tapered roller 54.

Regarding the bearing for use in the main motor, both end portions of a rotary shaft of the motor at its output side are supported by the cylindrical roller bearing or the ball bearing mounted on the frame of the rolling stock. The cylindrical roller bearing or the ball bearing includes an inner ring, an outer ring, a plurality of cylindrical rollers or balls which are interposed between the inner ring and the outer ring and rotatably roll, and an injection hole for supplying the grease to the cylindrical rollers or the balls.

The rotational output of the main motor is transmitted from an output rotary shaft thereof to a gear fitted on the output rotary shaft thereof. The rotation of the gear is transmitted to a gear fitted on an axle as the rotation of the axle.

The roller bearing of the bearing for use in the rolling stock in which the rolling bearing of the present invention is used is described below with reference to FIG. 1. FIG. 1 is a partly cut-out perspective view of the roller bearing. In the roller bearing, the roller 34a is disposed between the inner ring 32 and the outer ring 33 via the cage 35. The roller 34a is subjected to the rolling friction between the rolling surface 32a of the inner ring 32 and the rolling surface 33a of the outer ring 33 and the sliding friction between the flange portions 32b of the inner ring 32. To reduce the rolling and sliding frictions, the grease for use in the roller bearing is enclosed therein.

Figure 6:
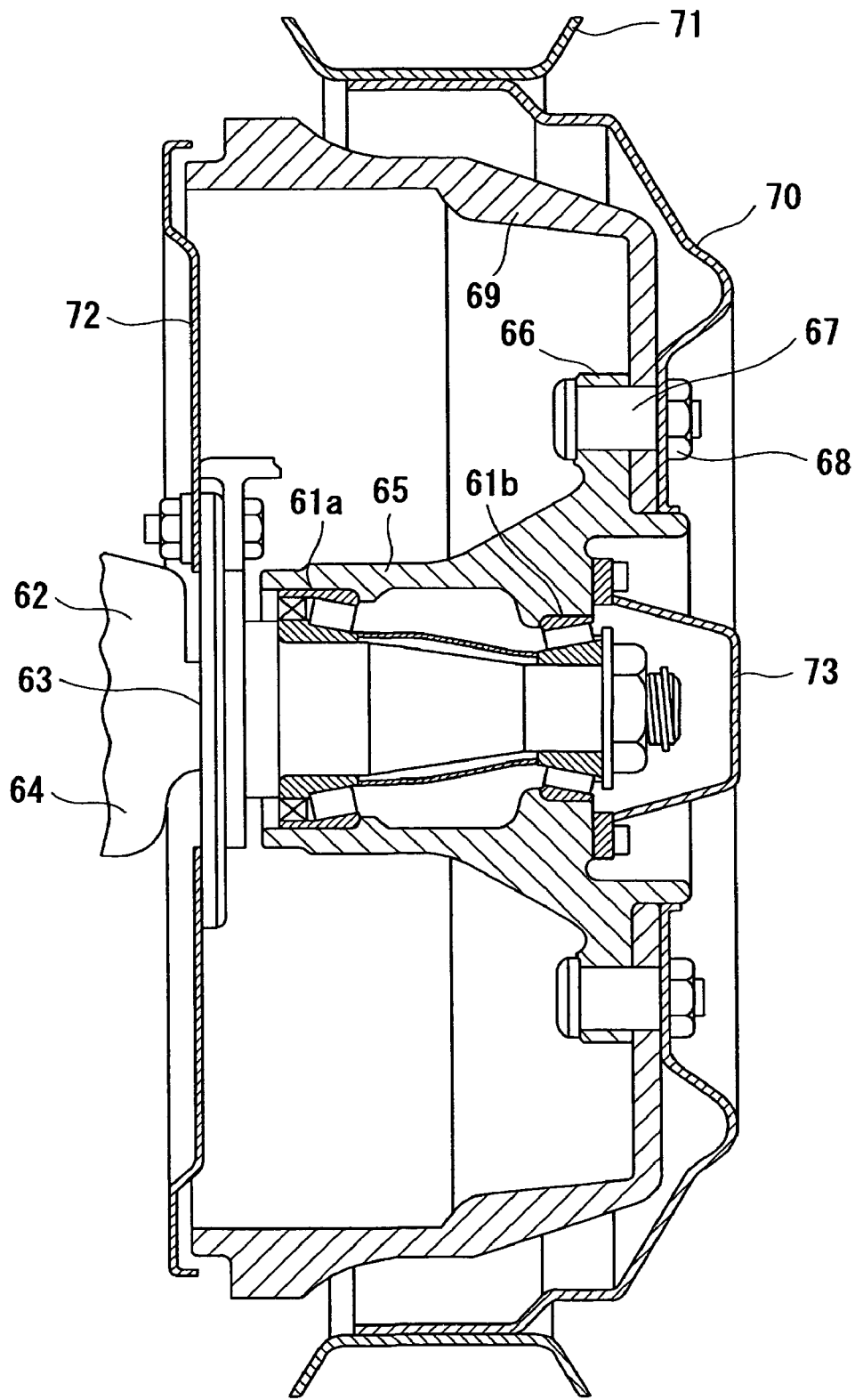
FIG. 6 is a sectional view of a wheel-supporting apparatus.

A wheel-supporting apparatus in which the rolling bearing of the present invention is used is described below with reference to FIG. 6. FIG. 6 is a sectional view of the wheel-supporting apparatus. As shown in FIG. 6, a flange 63 and an axle 64 are provided on a steering knuckle 62, and an axle hub 65 serving as a rotary member is rotatably supported by a pair of tapered roller bearings 61a, 61b mounted on an outside-diameter surface of the axle 64.

The axle hub 65 has a flange 66 on its outside-diameter surface. A braking drum 69 of a braking apparatus and a wheel disk 70 of a wheel are mounted by a stud bolt 67 provided on the flange 66 and a nut 68 engaging the stud bolt 67 with a screw. Reference numeral 71 denotes a rim mounted on the outside-diameter surface of the wheel disk 70. A tire is mounted on the rim.

A back plate 72 of the braking apparatus is mounted on a flange 63 of the steering knuckle 62 by tightening a bolt and a nut. A braking mechanism for imparting a braking force to the braking drum 69 is supported on the back plate 72. The braking mechanism is not drawn in FIG. 6.

A pair of the above-described tapered roller bearings 61a, 61b rotatably supporting the axle hub 65 is lubricated by grease enclosed inside the axle hub 65. To prevent the grease from leaking from the tapered roller bearing 61a and muddy water from penetrating into the rolling bearing from the outside, a grease cap 73 is mounted on an outer end surface of the axle hub 65, with the grease cap 73 covering the tapered roller bearing 61b.

Figure 2:
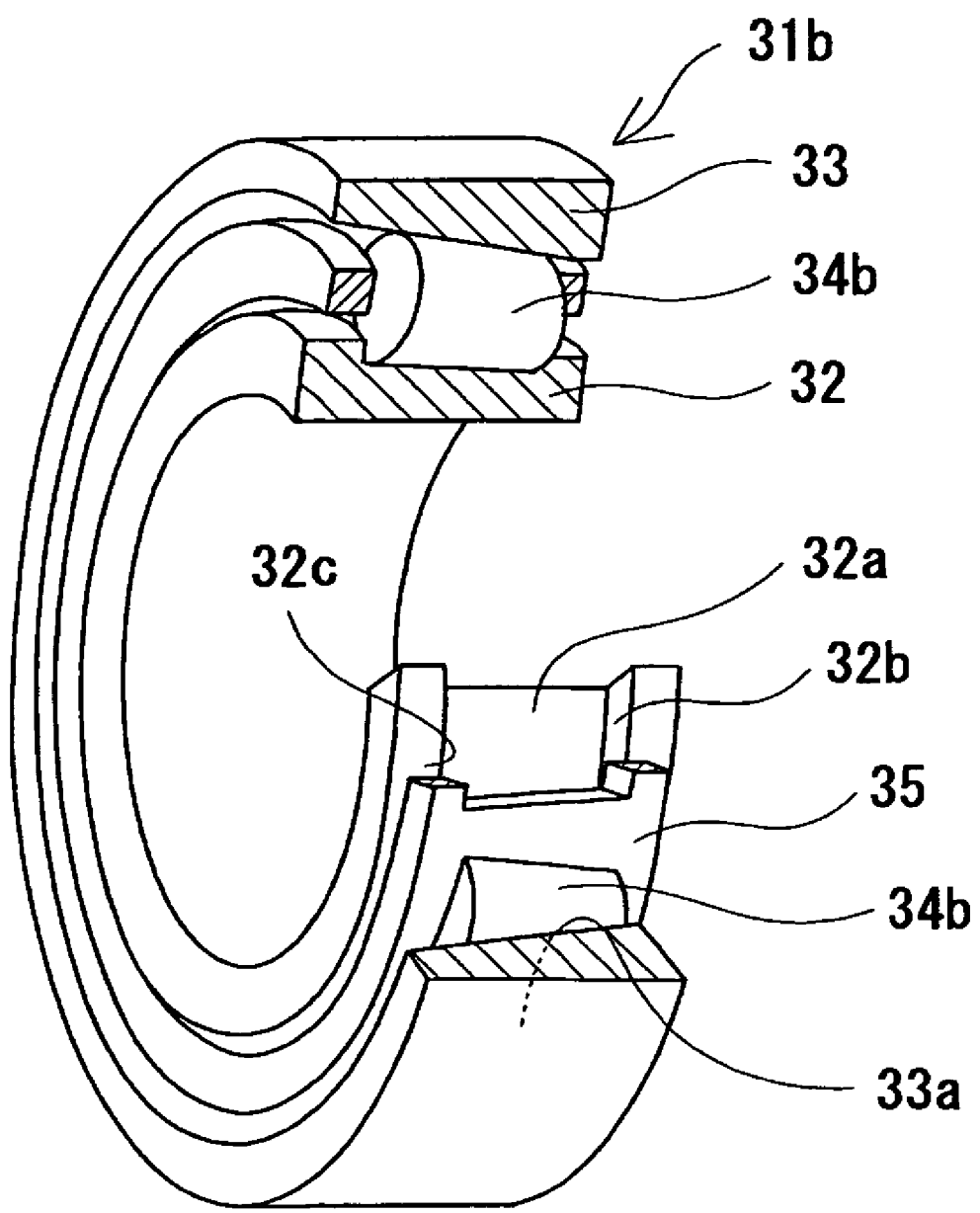
FIG. 2 is a partly cut-out perspective view of a tapered roller bearing.

One example of the tapered roller bearing of the present invention for use in the wheel-supporting apparatus is described below with reference to FIG. 2. FIG. 2 is a partly cut-out perspective view of the tapered roller bearing. In a tapered roller bearing 31b, a tapered roller 34b is disposed between the inner ring 32 and the outer ring 33 via the cage 35. The tapered roller 34b is subjected to rolling friction between the rolling surface 32a of the inner ring 32 and the rolling surface 33a of the outer ring 33, and subjected to sliding friction between the flange portions 32b and 32c of the inner ring 32. To reduce the rolling and sliding frictions, the grease for use in the roller bearing is enclosed therein.

Figure 7:
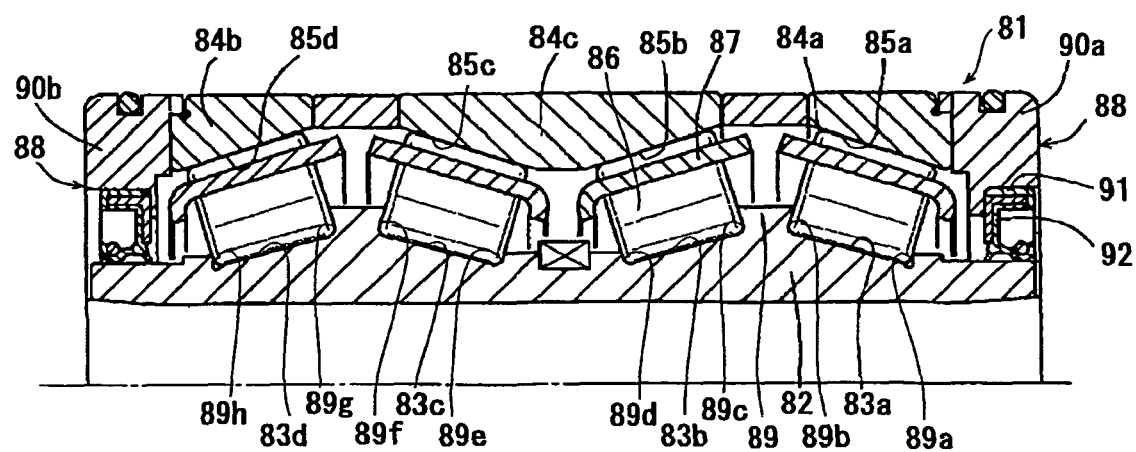
FIG. 7 is a sectional view of a bearing for use in a rolling neck of a rolling machine.

A bearing for use in a rolling neck of a rolling machine in which the rolling bearing of the present invention is used is described below with reference to FIG. 7. FIG. 7 is a sectional view of the bearing for use in the rolling neck of the rolling machine. As shown in FIG. 7, a closed-type four-row tapered roller bearing 81 mounted on the rolling neck of the rolling machine has one inner ring 82 having rolling surfaces 83a, 83b, 83c, and 83d disposed in four rows; a pair of outer rings 84a, 84b having rolling surfaces 85a, 85d disposed in a single row respectively; one outer ring 84c having rolling surfaces 85b, 85c disposed in two rows respectively; tapered rollers 86 rotatably disposed in four rows between the rolling surfaces 83a, 83b, 83c, and 83d of the inner ring 82 and the rolling surfaces 85a, 85d, 85b, and 85c of the outer rings 84a, 84b, and 84c; and a cage 87 holding tapered rollers 86 circumferentially at predetermined intervals. A seal member 88 is mounted at both end portions of each of the outer rings 84a, 84b disposed at both sides of the bearing. A large flange 89 is provided at a central portion of each inner ring 82. When the bearing is used, the tapered rollers 86 roll on the rolling surfaces 83, while the tapered rollers 86 are being guided by the large flange 89.

The tapered rollers 86 are subjected to rolling friction between the rolling surfaces 83a, 83d of the inner ring 82 and the rolling surfaces 85a, 85d, 85b, and 85c of the outer rings, and sliding friction between flange portions 89a, 89b, 89c, 89d, 89e, 89f, 89g, and 89h of the inner ring 82. To reduce the rolling and sliding frictions, the grease for use in the roller bearing is enclosed therein.

The seal member 88 mounted on the end portion of each of the outer rings 84a, 84b slidingly contacts the outside-diameter surface of the inner ring 82, thus sealing the inside of the bearing. The seal member 88 includes sealing cases 90a, 90b mounted at the end portion of each of the outer rings 84a, 84b disposed at both sides of the bearing and a contact-type oil seal 92 fitted in an annular groove 91 formed on the inside-diameter portion of each of the sealing cases 90a, 90b.

Four examples of the construction of the wheel-supporting rolling bearing unit preferable in carrying out the present invention are described below.

Figure 8:
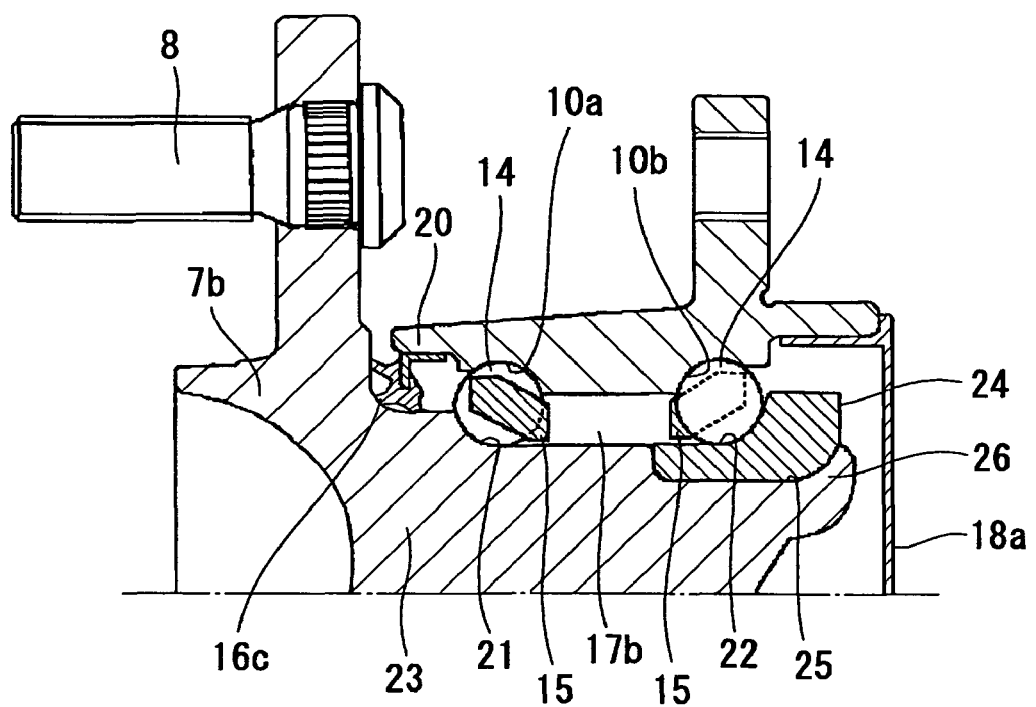
FIG. 8 is a sectional view of a first example of the construction of a wheel-supporting rolling bearing unit.
Figure 13:
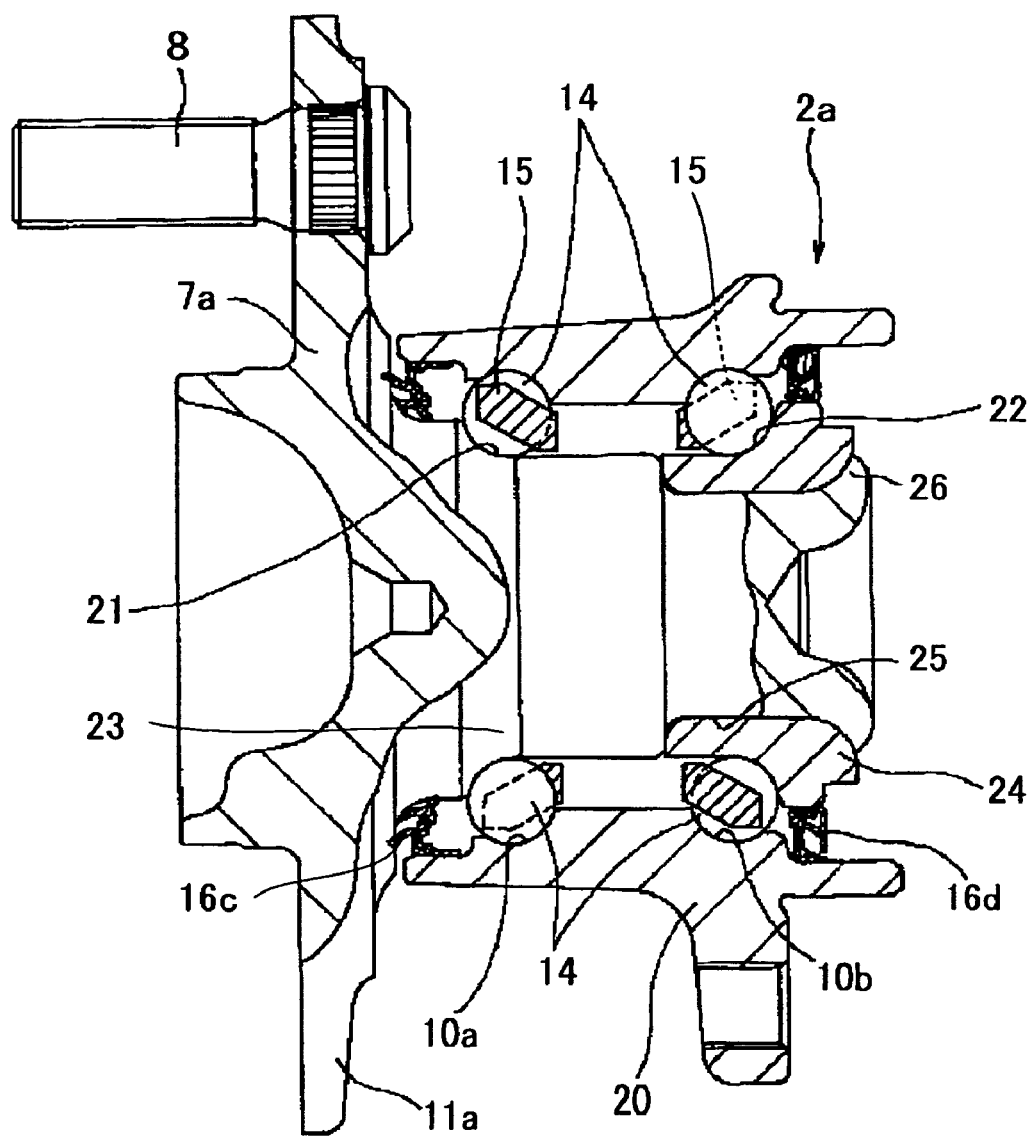
FIG. 13 is a sectional view of a second example of the conventional construction of the wheel-supporting rolling bearing unit.

A first example of the preferable construction of the wheel-supporting rolling bearing unit in which the rolling bearing of the present invention is used is shown in FIG. 8. The first example has a construction for supporting a driven wheel (front wheel of FR car and RR car, rear wheel of FF car) and for reducing the rotational torque of the hub 7b to a higher extent by improving the above-described construction shown in FIG. 13. For this purpose, in the case of the first example, an open portion of the inner end of an outer ring 20 is closed with a cap 18a, and the space between the inner peripheral surface of an outer end portion of the outer ring 20 and the peripheral surface of an intermediate portion of the hub body 23 is closed with a seal ring 16c. Because the cap 18a is provided, it is possible to omit the provision of a seal ring 16d, shown in FIG. 13, which is disposed between the inner peripheral surface of the inner end portion of the outer ring 20 and the peripheral surface of the inner ring 24. The seal ring 16c and the cap 18a prevent foreign matters such as muddy water from penetrating into an inner space 17b in which balls 14, 14 are mounted. 0.01 to 15 wt % of the bismuth or the inorganic bismuth is added to the entirety of the grease to be enclosed in the inner space 17b. The constructions of the other parts are similar to the conventional constructions shown in FIG. 13. When the wheel-supporting rolling bearing unit of the present invention is applied to the driven wheel, the seal ring is not provided between the inner peripheral surface of the inner end portion of the outer ring and the peripheral surface of the inner ring. Thus it is possible to make the rotational torque of the hub lower than that of the hub of the conventional wheel-supporting rolling bearing unit.

Figure 9:
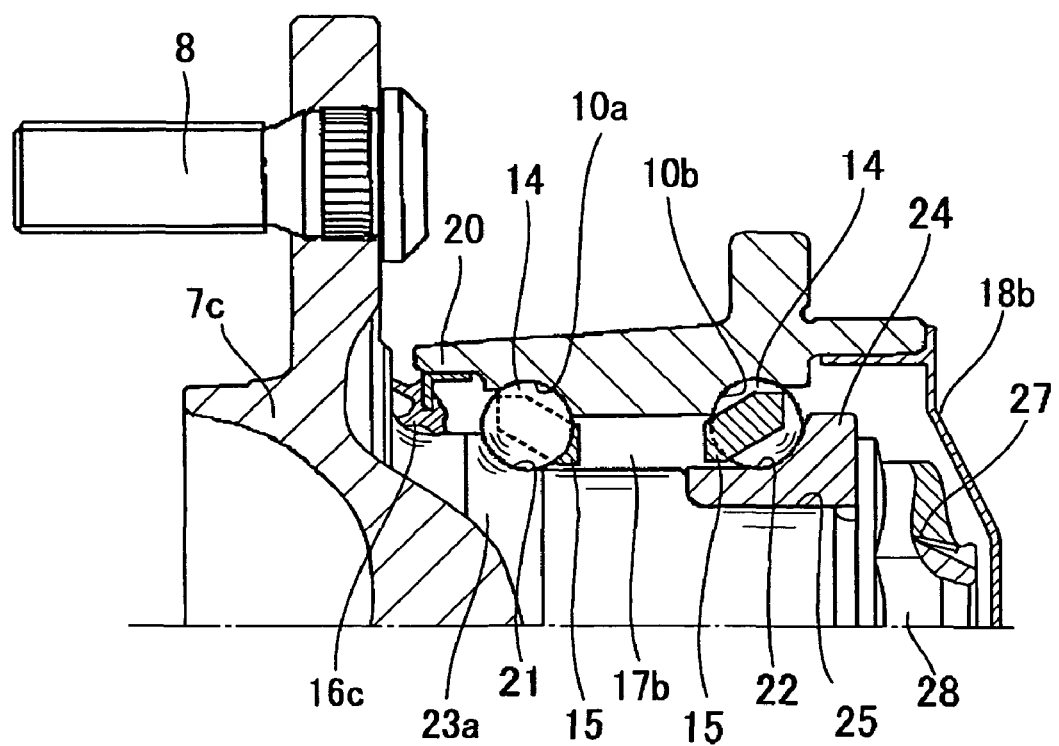
FIG. 9 is a sectional view of a second example of the construction of the wheel-supporting rolling bearing unit.

A second example of the preferable construction of the wheel-supporting rolling bearing unit of the present invention is shown in FIG. 9.

The second example has also a construction for supporting the driven wheel (front wheel of FR car and RR car, rear wheel of FF car). In the case of the second example, an external thread portion 27 is formed at an inner end portion of a hub body 23a constituting a hub 7c, and an inner end surface of an inner ring 24 fitted on a small-diameter stepped portion 25 of the hub body 23a is held down with a nut 28 screwed on the external thread portion 27. In conformity to this, a cap 18b mounted on an open portion disposed at the inner end of an outer ring 20 is bulged to prevent the external thread portion 27 and the nut 28 from interfering with the cap 18b. Other constructions are similar to those of the above-described first example.

Figure 10:
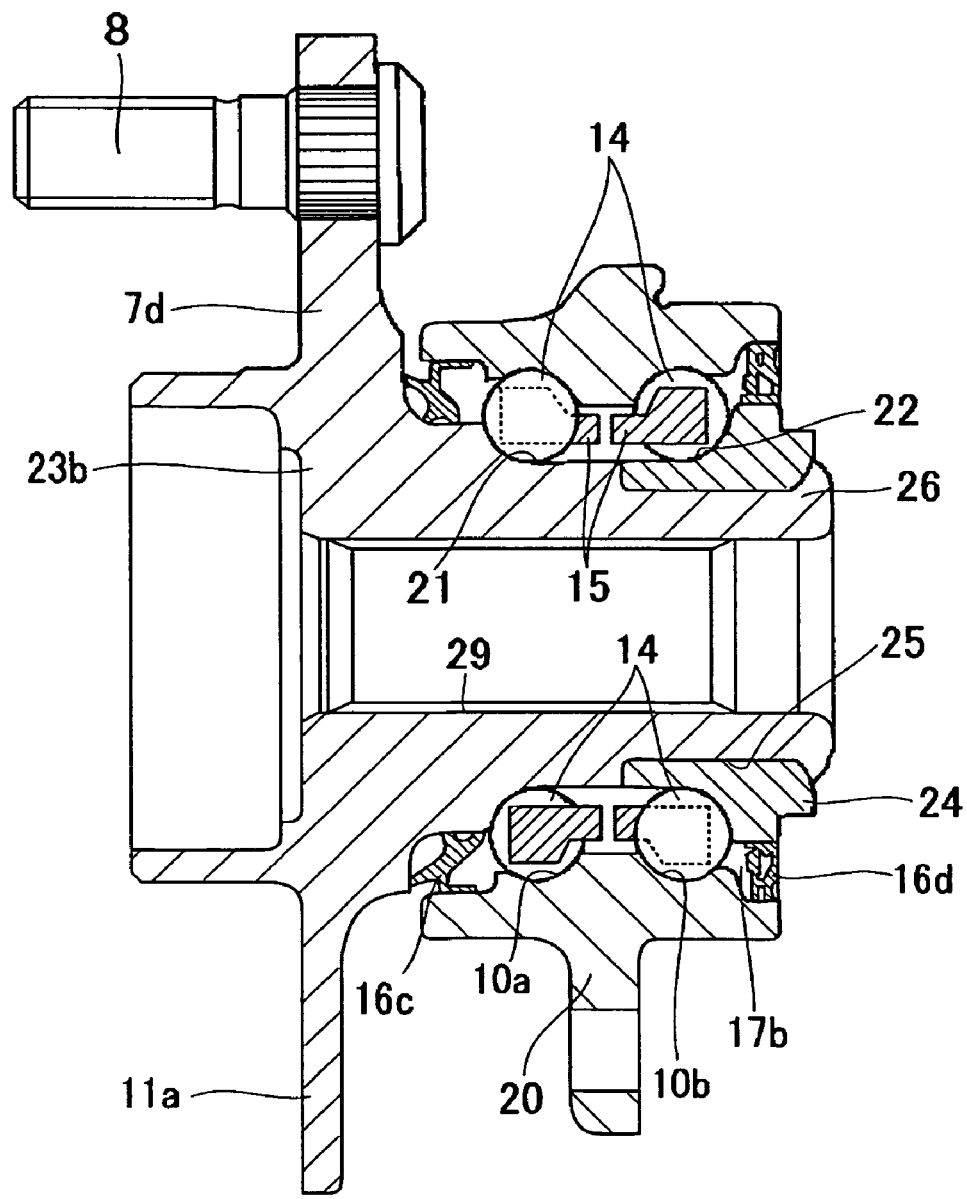
FIG. 10 is a sectional view of a third example of the construction of the wheel-supporting rolling bearing unit.

A third example of the preferable construction of the wheel-supporting rolling bearing unit of the present invention is shown in FIG. 10. The third example has a construction for supporting a driving wheel (rear wheel of FR car and RR car, front wheel of FF car, all wheels of 4WD car).

To realize this construction, in the case of the third example, a spline hole 29 is formed at a central portion of a hub body 23b constituting a hub 7d, serving as a rotational-side bearing ring, which is rotatably supported on the inside-diameter side of the outer ring 20 serving as a stationary-side bearing ring. In a state in which the bearing unit is mounted on a vehicle, a spline shaft (not shown) attached to the constant velocity joint is inserted into the spline hole 29.

When the wheel-supporting rolling bearing unit of the present invention is applied to the driving wheel, because the spline hole is formed at the central portion of the hub body having the hub serving as the rotational-side bearing ring, by connecting the spline shaft attached to the constant velocity joint to the spline hole, the rotational torque of the constant velocity joint can be reliably transmitted to the hub.

The hub 7d is constructed by holding down an inner end surface of an inner ring 24 fitted on a small-diameter stepped portion 25 formed at an inner end portion of the hub body 23b by means of a caulking portion 26 formed by plastically deforming the inner end portion of the hub body 23b radially outward and fixing the inner ring 24 to the hub body 23b. Seal rings 16c, 16d are provided between inner peripheral surfaces of both end portions of the outer ring 20 and the peripheral surface of the intermediate portion of the hub body 23b as well as the peripheral surface of the inner end portion of the inner ring 24 to disconnect an inner space 17b in which the balls 14, 14 are provided and an outer space from each other between the inner peripheral surface of the outer ring 20 and the peripheral surface of the hub 7d. Other constructions are similar to those of the above-described first and second examples.

Figure 11:
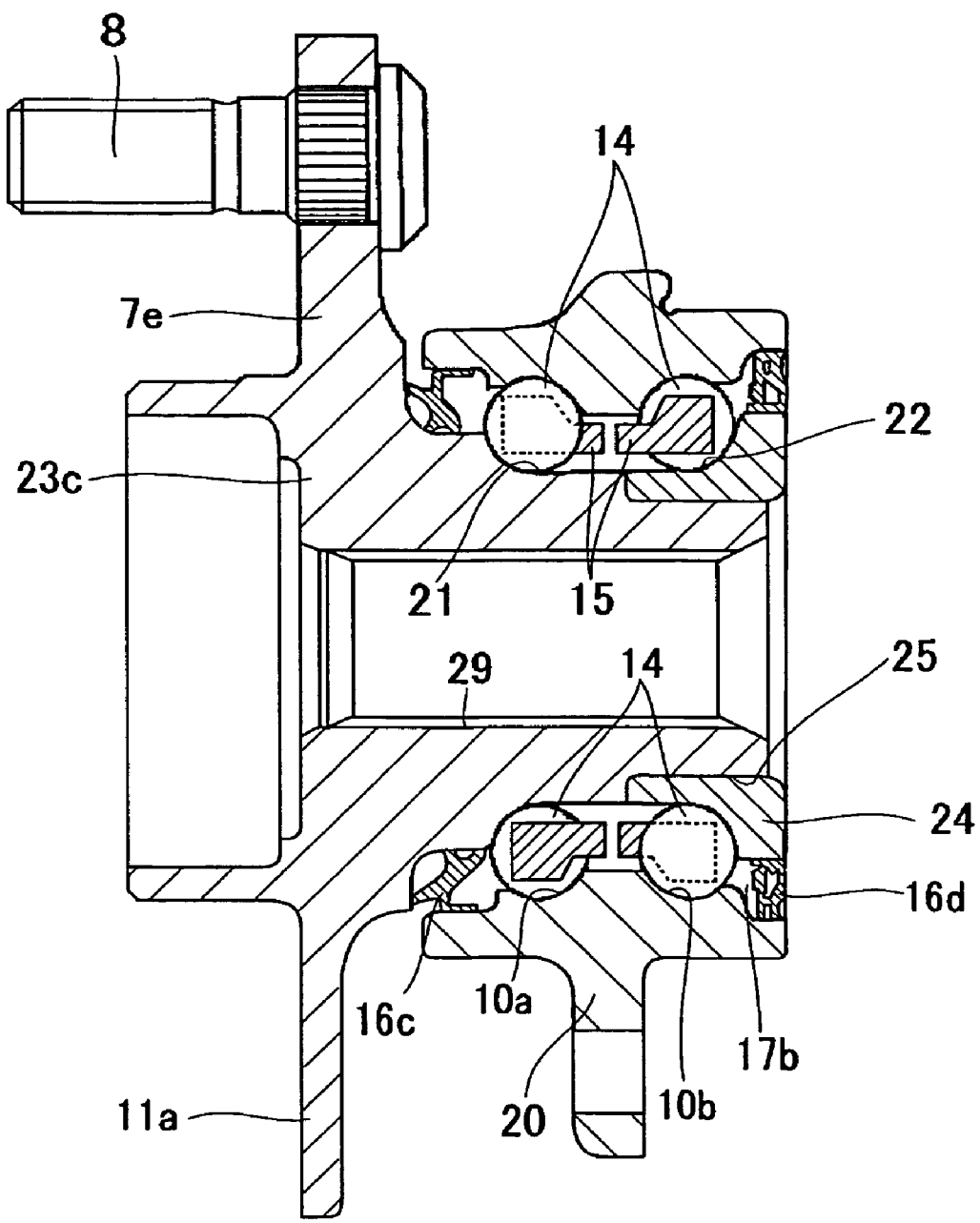
FIG. 11 is a sectional view of a fourth example of the construction of the wheel-supporting rolling bearing unit.
Figure 12:
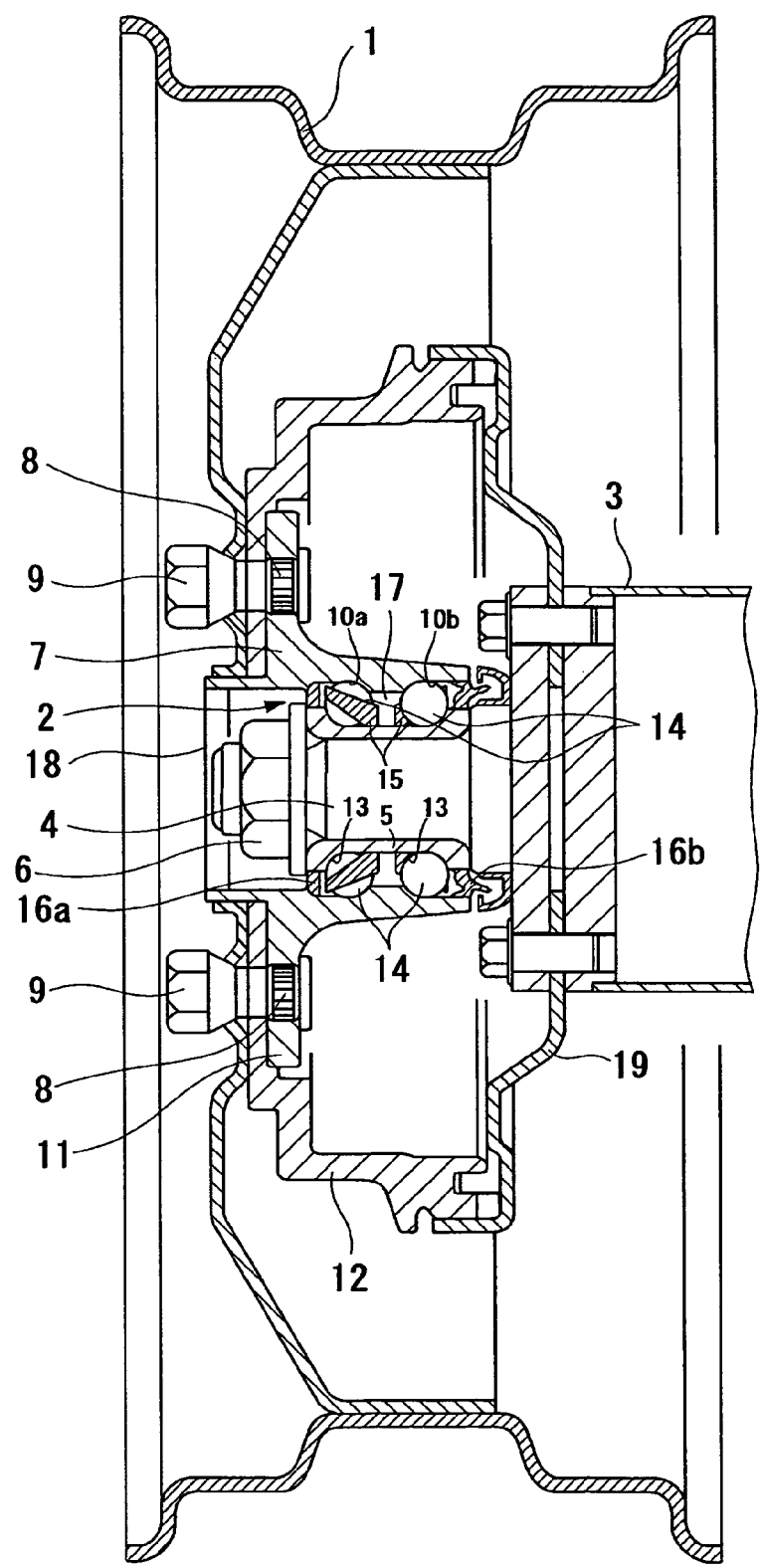
FIG. 12 is a sectional view of a first example of the conventional construction of the wheel-supporting rolling bearing unit.

A fourth example of the preferable construction of the wheel-supporting rolling bearing unit of the present invention is shown in FIG. 11. The fourth example also has a construction for supporting the driving wheel (rear wheel of FR car and RR car, front wheel of FF car, all wheels of 4WD car).

In the case of the fourth example, an inner end surface of an inner ring 24, fitted on a small-diameter stepped portion 25 formed at an inner end portion of a hub body 23c, which constructs a hub 7e together with the hub body 23c is projected inward from an inner end surface of the hub body 23c. In a state in which the bearing unit is mounted on a vehicle, an outer end surface of an unshown constant velocity joint strikes against the inner end surface of the inner ring 24. Thereby the inner ring 24 is prevented from slipping off from the small-diameter stepped portion 25. Other constructions of the bearing unit of the fourth example are similar to those of the bearing unit of the above-described third example.

The bismuth or the inorganic bismuth, the base oil, the thickener, and the additive composing the grease that can be preferably applied to the four examples of the above-described constructions of the wheel-supporting rolling bearing units of the present invention are described below.

The wheel-supporting rolling bearing unit of the present invention in which the grease containing the bismuth or the inorganic bismuth can be enclosed is not limited to the above-described four examples of the wheel-supporting rolling bearing units of the present invention having the above-described constructions, but the grease containing the bismuth or the inorganic bismuth is applicable to the above-described two examples having the above-described conventional constructions.

Figure 16:
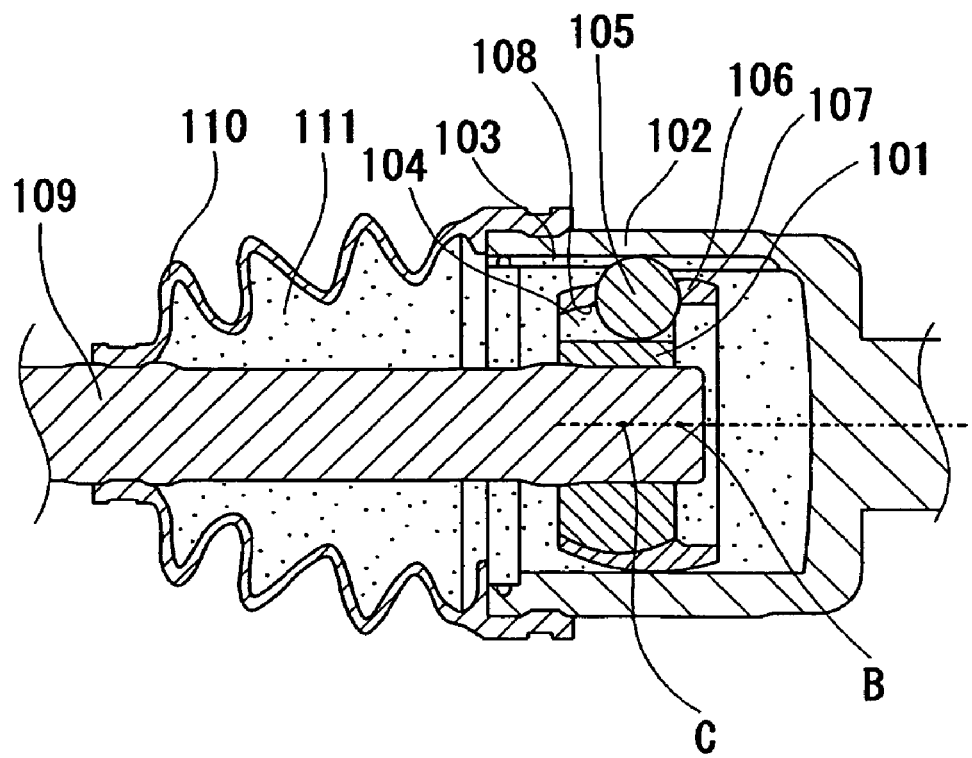
FIG. 16 is a partly cut-out sectional view of a constant velocity joint of a double off-set type.

The grease for use in the constant velocity joint is enclosed in the constant velocity joint of the present invention. For example, as a representative constant velocity joint of a plunging-type, a constant velocity joint of a double off-set type and a constant velocity joint of a tri-port type are known. As shown in FIG. 16, in the constant velocity joint of the double off-set type, six track grooves 103, 104 are axially equiangularly formed on an inner surface of an outer ring 102 and an outer surface of a spherical inner ring 101, a ball 105 incorporated between the track grooves 103 and 104 is supported by a cage 106, and the periphery of the cage 106 is set as a spherical surface 107, and the inner periphery thereof is set as a spherical surface 108 fitting on the periphery of the inner ring 101, and centers B, C of the spherical surfaces 107, 108 are axially shifted from each other on the axis of the outer ring 102.

The periphery of the outer ring 102 and the periphery of a shaft 109 are covered with a boot 110, and a grease 111 of the present invention for use in the constant velocity joint is filled and sealed inside the boot 110. As described above, the plunging-type constant velocity joint has much more sliding elements than rolling elements. The grease containing the bismuth or the inorganic bismuth superior in the resistance to heat and durability is enclosed in the constant velocity joint of the present invention. Thus by supplying the bismuth or the inorganic bismuth to rolling and sliding contact portions, the constant velocity joint is capable of maintaining the extreme-pressure property effect for a long time.

Figure 17:
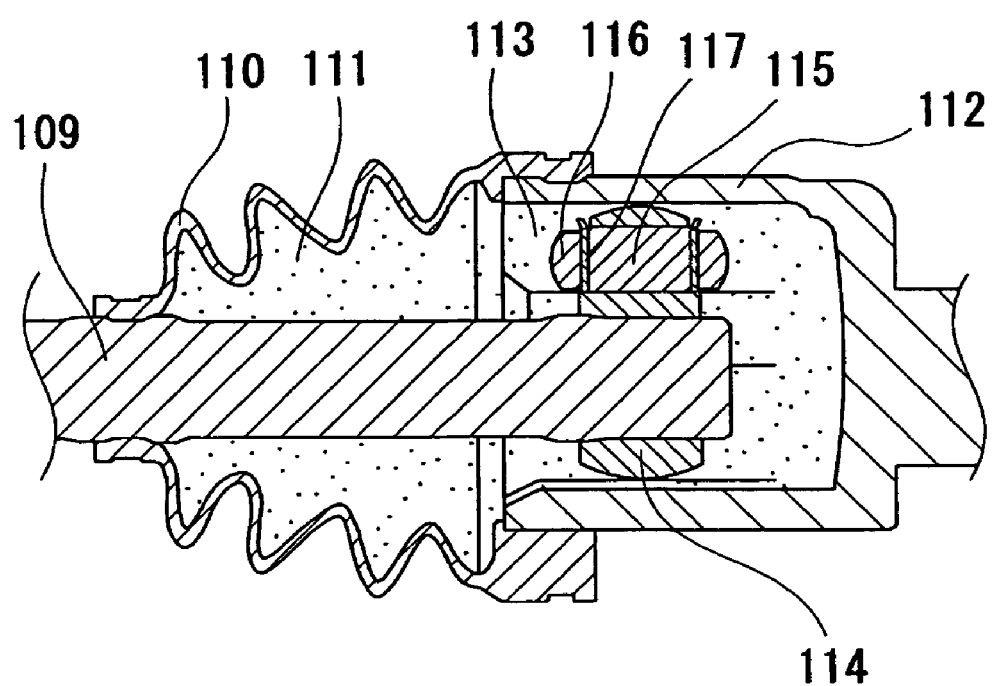
FIG. 17 is a partly cut-out sectional view of a constant velocity joint of a tri-port type.

As shown in FIG. 17, in the constant velocity joint of the tri-port type, three cylindrical track grooves 113 are axially equiangularly formed on an inner surface of an outer ring 112, three leg-like shafts 115 are provided on a tri-port member 114 incorporated at an inner side of the outer ring 112, a spherical roller 116 is fitted on an outer side of each leg-like shaft 115, a needle 117 is incorporated between the spherical roller 116 and the leg-like shafts 115 to thereby support the spherical roller 116 is rotatably and axially slidably, and the spherical roller 116 is fitted on the track groove 113.

The periphery of the outer ring 112 and the periphery of the shaft 109 are covered with a boot 110, and the grease 111 for use in the constant velocity joint of the present invention is filled and sealed inside the boot 110.

In the constant velocity joint of the plunging-type having the above-described construction, owing engagement between the track grooves 103, 104 and the ball 105 and between the track groove 113 and the spherical roller 116, the rotational torque is transmitted, and the ball 105 and the spherical roller 116 roll along the track grooves 103 and 113 respectively to absorb the torque.

When the rotational torque is transmitted in a state in which the constant velocity joint takes an operational angle, in the constant velocity joint of the double off-set type, rolling and sliding are generated in the fitting of the ball 105 on the track grooves 103, 104, and sliding is generated between the cage 106 and the outer ring 102 and between the cage 106 and the inner ring 101. On the other hand, in the constant velocity joint of the tri-port type, rolling and sliding are generated between the track groove 113 and the spherical roller 116. The grease containing the bismuth or the inorganic bismuth superior in the resistance to heat and durability is enclosed in the constant velocity joint of the present invention. Thus by supplying the bismuth or the inorganic bismuth to rolling and sliding contact portions, the constant velocity joint is capable of maintaining the extreme-pressure property effect for a long time.

The form of the rolling bearing of the present invention on which the coating film of bismuth or the like is formed is not limited to a specific form.

Figure 3:
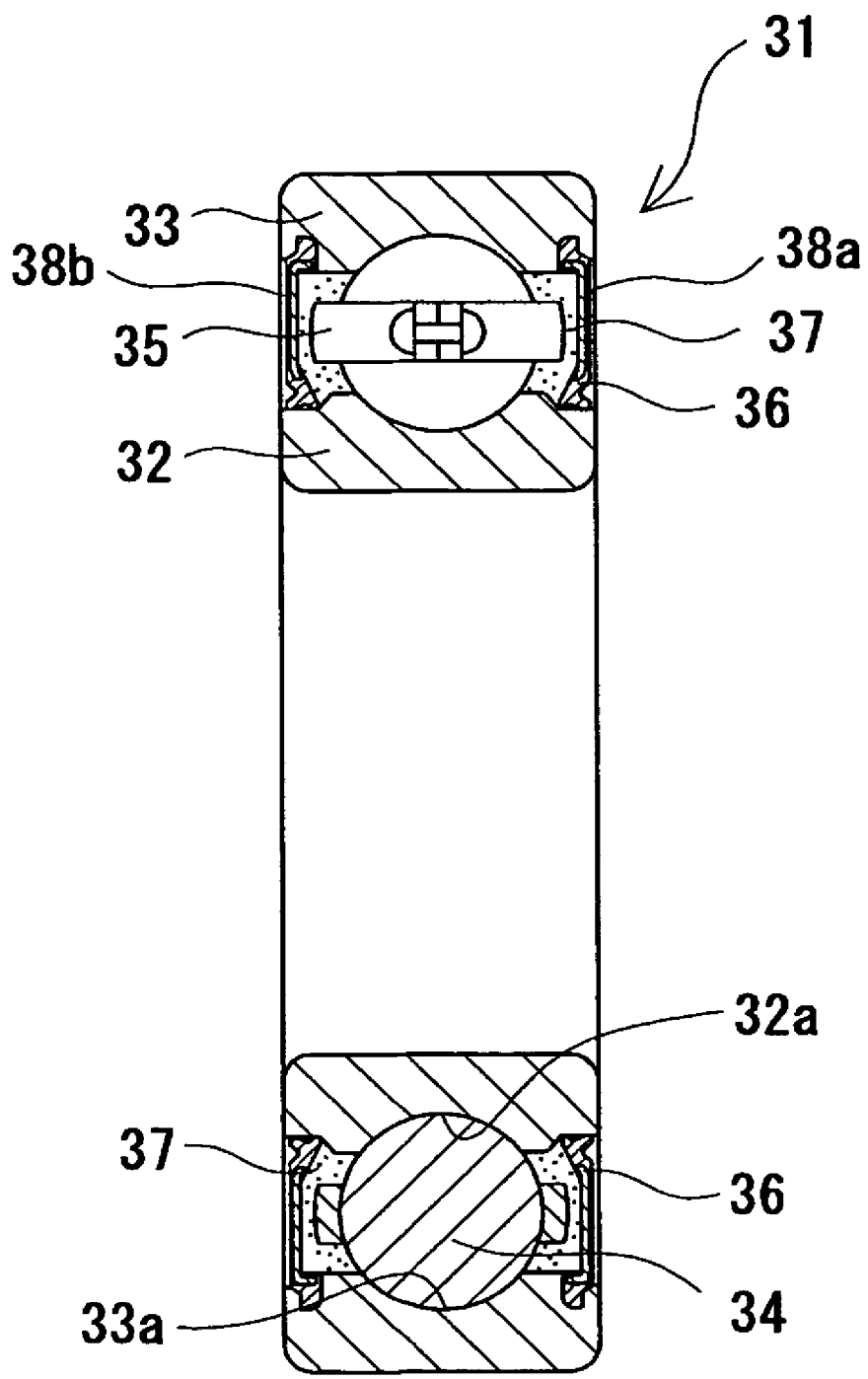
FIG. 3 is a sectional view of a deep groove ball bearing.

One example of the rolling bearing of the present invention is shown in FIG. 3. FIG. 3 is a sectional view of a deep groove ball bearing in which grease is enclosed.

In a deep groove ball bearing 31, an inner ring 32 having an inner ring rolling surface 32a on its peripheral surface and an outer ring 33 having an outer ring rolling surface 33a on its inner peripheral surface are concentrically disposed, and a plurality of rolling elements 34 is disposed between the inner ring rolling surface 32a and the outer ring rolling surface 33a.

The coating film of the bismuth or the like of the present invention is formed on at least one contact surface selected from among the surfaces of the inner ring rolling surface 32a, the outer ring rolling surface 33a, and the rolling elements 34.

A cage 35 holding the rollers 34 and a seal member 36 fixed to the outer ring 33 are provided at openings 38a and 38b, of the inner ring 32 and the outer ring 33, disposed at both axial ends of the inner ring 32 and the outer ring 33 respectively. It is essential to apply a grease 37 to the peripheries of rollers 34.

The seal member 36 may be made of metal or rubber molding or may be a composite of the rubber molding, a metal plate, a plastic plate, and a ceramic plate. The composite of the rubber molding and the metal plate is preferable in consideration of durability and easiness in adherence.

Another example of the rolling bearing of the present invention is shown in FIG. 2. FIG. 2 is a partly cut-out perspective view of the tapered roller bearing. In the tapered roller bearing 31b, the tapered roller 34b is disposed between the inner ring 32 and the outer ring 33 through the cage 35. The tapered roller 34b is subjected to rolling friction between the rolling surface 32a of the inner ring 32 and the rolling surface 33a of the outer ring 33 and sliding friction between the flange portions 32b and 32c of the inner ring 32.

The coating film of the bismuth or the like of the present invention is formed on at least one contact surface selected from among the rolling surface 32a of the inner ring 32, the rolling surface 33a of the outer ring 33, and the surface of the tapered roller 34b.

To reduce the rolling and sliding frictions, grease for use in the rolling bearing is enclosed in the roller bearing.

As materials which can be used for the rolling parts of the present invention, known metal materials which can be adopted for bearing parts (inner and outer rings, rolling element, cage, and the like) are used, and the kind of the metal materials is not specifically limited. As examples of materials for use in the bearing ring, bearing steel (high-carbon chromium bearing steels JIS G 4805), steel for case hardening (JIS G 4104), high-speed steel (AMS6490), stainless steel (JIS G 4303), and induction-hardened steel (JIS G 4051) are listed. As materials for the cage, a steel plate (JIS G 3141) for a pressed cage, carbon steel (JIS G 4051) for a machined cage, and high-strength brass casting (JIS H 5102) for the machined cage are listed. It is also possible to adopt white metal composed of gun metal, lead, and tin and other bearing alloys.

The coating film of the bismuth or the like should be formed on the contact surfaces of the rolling parts that can be used in the present invention. The method of forming the coating film is not limited to a specific method.

Figure 18:
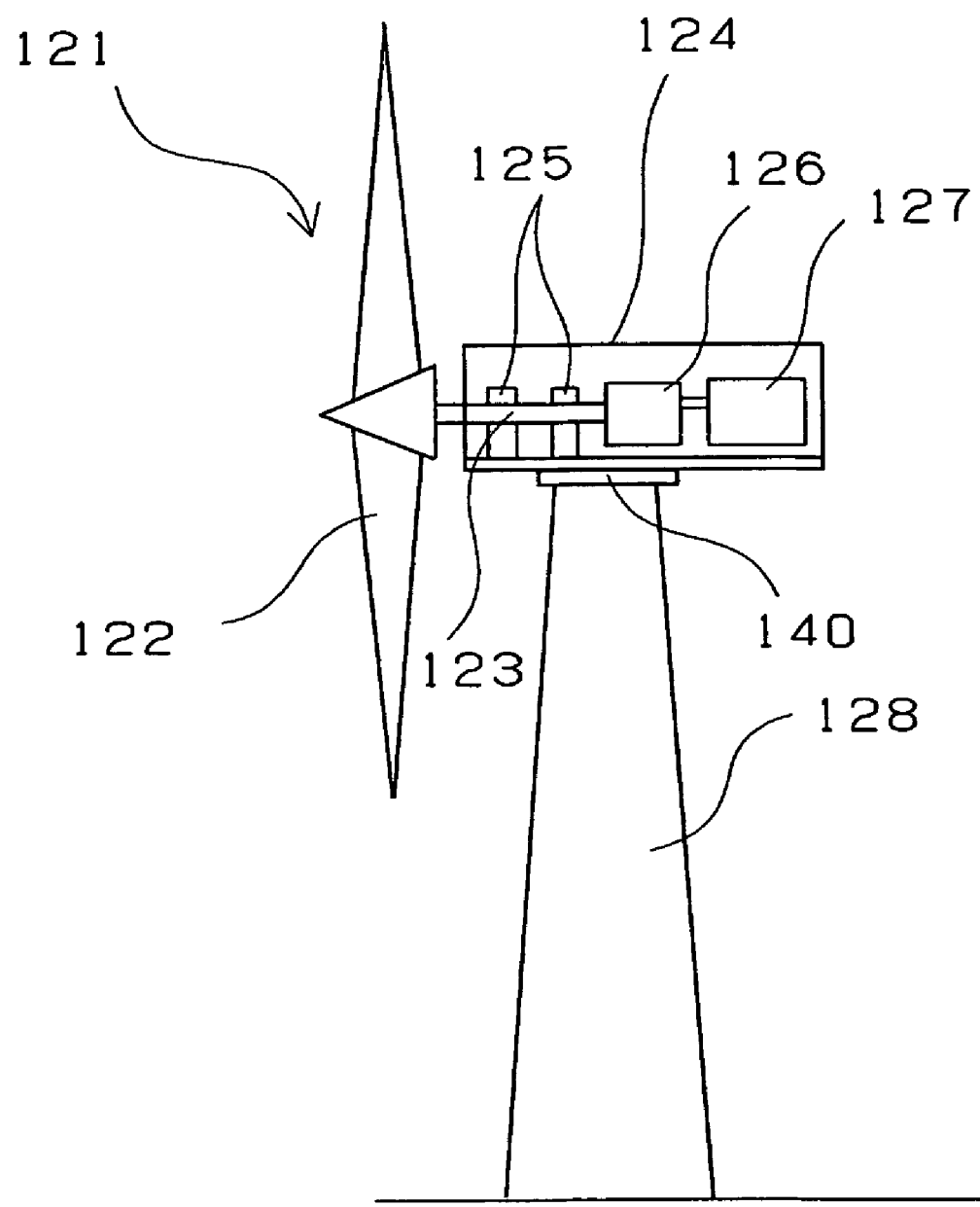
FIG. 18 is an illustration of an entire wind power generator including a main shaft-supporting apparatus for wind power generation.
Figure 19:
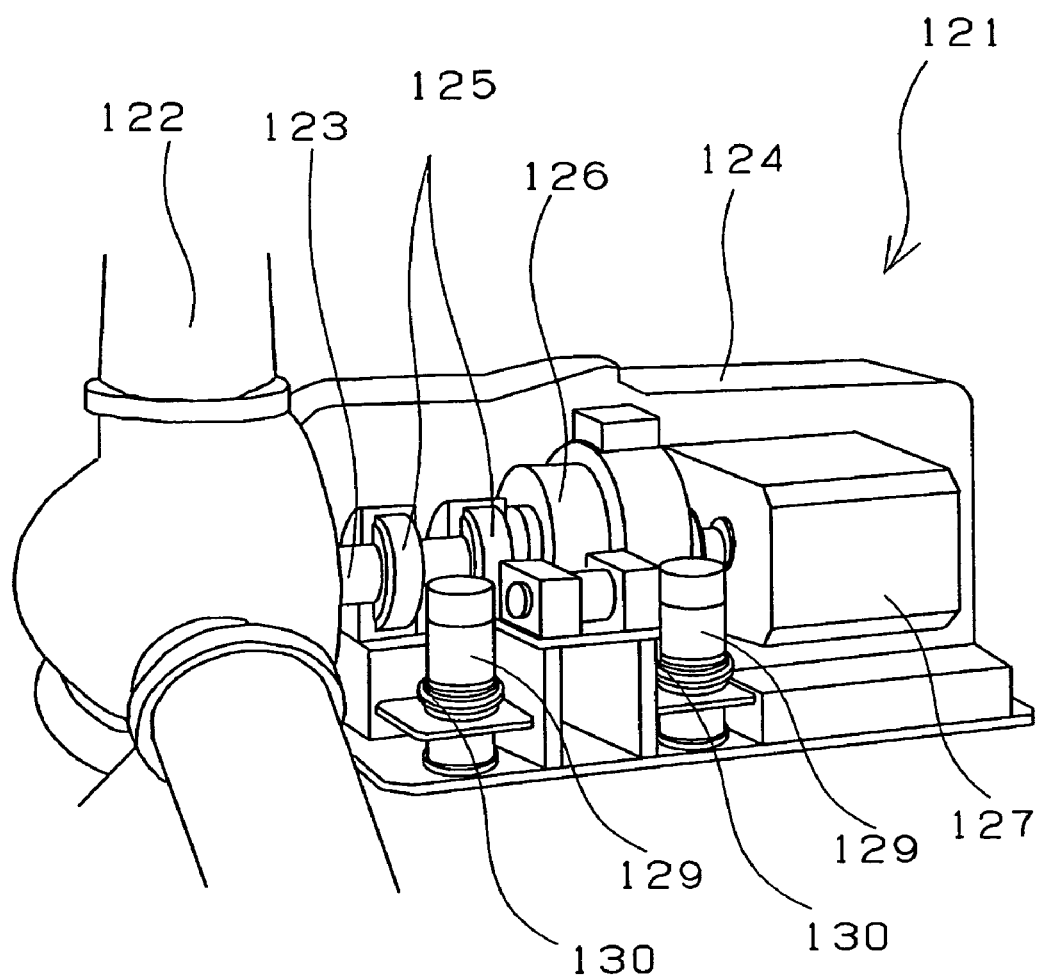
FIG. 19 shows the main shaft-supporting apparatus for wind power generation.

An apparatus for supporting a main shaft for wind power generation is described with reference to FIGS. 18 and 19. FIG. 18 is an illustration of an entire wind power generator including the apparatus for supporting the main shaft for wind power generation. FIG. 19 shows the apparatus for supporting the main shaft for wind power generation shown in FIG. 18. As shown in FIGS. 18 and 19, in a wind power generator 121, a main shaft 123 on which a blade 122 serving as a windmill is mounted is rotatably supported by a bearing 125 mounted in a bearing housing 135 disposed inside a nacelle 124, and inside the nacelle 124, a speed-up gear 126 and a generator 127 are mounted. The speed-up gear 126 increases the rotation of the main shaft 123 and transmits an increased rotational speed thereof to an input shaft of the generator 127. The nacelle 124 is pivotally mounted on a supporting base 128 through a swing bearing 140 and driven by a motor 129 of FIG. 19 for pivotal use through a reduction gear 130. The nacelle 124 is pivoted so that the direction of the blade 122 confronts the direction of wind. Although two bearings 125 for supporting the main shaft are provided in the example of FIG. 19, the number of the bearings 125 may be one.

Figure 20:
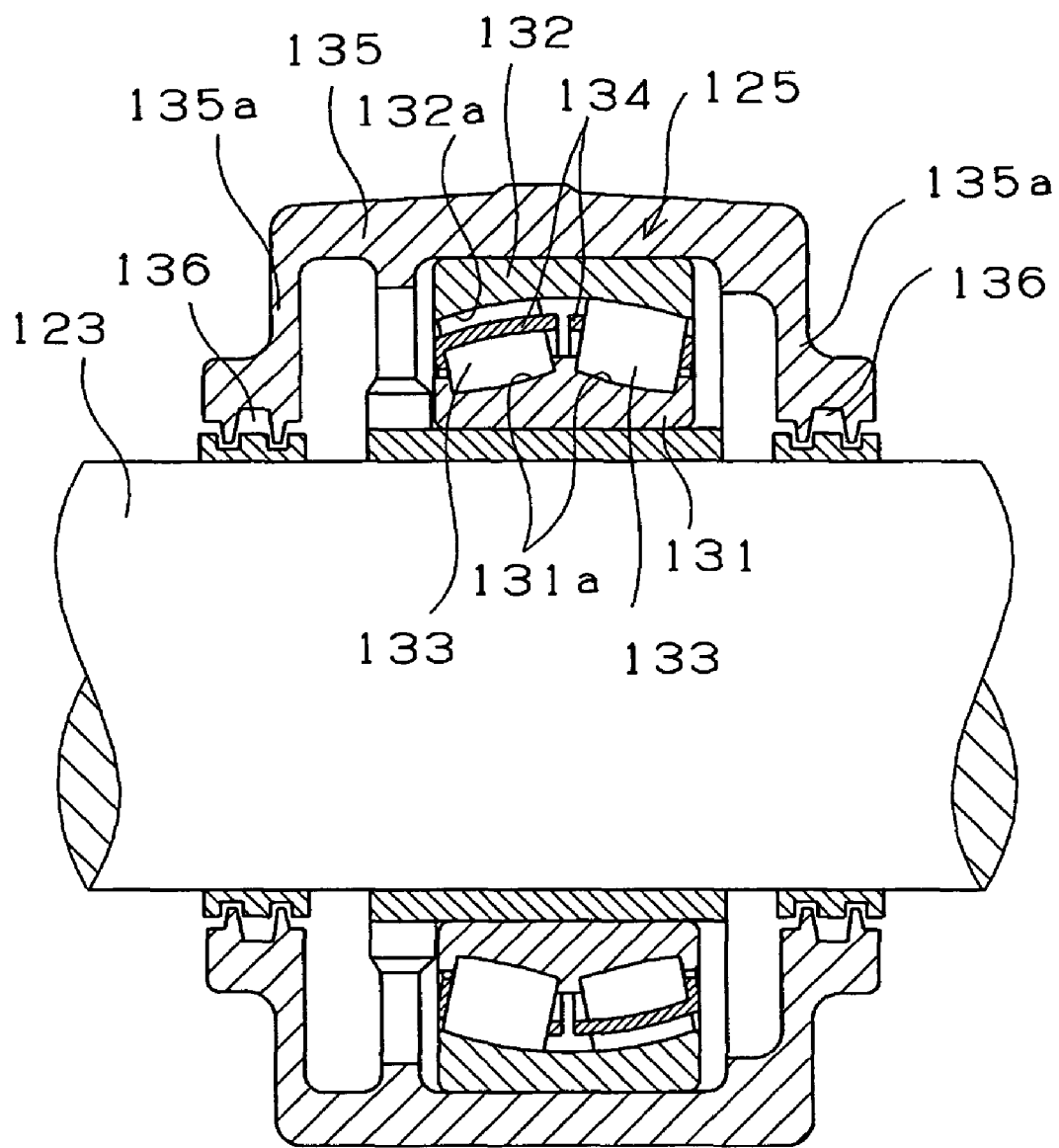
FIG. 20 shows a mounting construction of a main shaft-supporting bearing of the main shaft-supporting apparatus for wind power generation.

The mounted construction of the bearing 125 for supporting the main shaft is described below with reference to FIG. 20. FIG. 20 shows the mounted construction of the main shaft-supporting bearing 125 of the apparatus for supporting the main shaft for wind power generation. The bearing 125 has an inner ring 131 and an outer ring 132 making a pair of bearing rings and a plurality of rolling elements 133 interposed between the inner ring 131 and the outer ring 132. The bearing 125 should be a radial bearing to which a thrust load is applicable and may be a spherical roller bearing and in addition an angular ball bearing, a tapered roller bearing or a deep groove ball bearing. Of these bearings, the spherical roller bearing is preferable as a bearing for supporting the main shaft for wind power generation which is driven in a region of a wide range from a lightweight load to a heavy load applied at the time of a sudden gust of wind and in a state in which the direction of wind always changes, because the spherical roller bearing is capable of absorbing the bending of the main shaft caused by the operation of the apparatus. The double row spherical roller bearing of the present invention in which the grease containing the inorganic bismuth is enclosed can be preferably used as a double row spherical roller bearing capable of performing its function even though load capacities applied to rows are different from one another and as the bearing for supporting the main shaft for wind power generation in which a large thrust load is applied as compared with a radial load and a larger load is applied to a bearing portion of a row farther from a blade than a bearing portion of a row nearer to the blade. This is because the double row spherical roller bearing of the present invention is excellent in the frictional wear and long-term durability thereof.

A raceway surface 132a of the outer ring 132 of the bearing 125 is spherical, and the peripheral surface of each rolling element 133 is formed as a roller spherical along the raceway surface 132a of the outer ring. The inner ring 131 has a flange-provided construction separately having raceway surfaces 131a, 131a of respective rows. The rolling elements 133 are held by cages 134 respectively for each row.

The outer ring 132 is mounted by fitting the outer ring 132 on the inside-diameter surface of the bearing housing 135, and the inner ring 131 is fitted on the periphery of the main shaft 123 and supports the main shaft 123. In the bearing housing 135, a seal 136 such as a labyrinth seal is constructed between a side wall portion 135a covering both ends of the bearing 125 and the main shaft 123. Because the bearing housing 135 provides sealing property, a construction not having a seal is used for the bearing 125. The bearing 125 serves as the bearing for supporting the main shaft for wind power generation according to an embodiment of the present invention.

EXAMPLES

Examples 1 Through 11

In a reaction container, as shown in table 1, a thickener was added to base oil, and uniformalizing treatment was performed by using a triple roll mill to obtain lithium soap/mineral oil-based grease (viscosity of base oil at 40° C.: 100 mm$^2$/s, mixing consistency: 220), urea/PAO oil-based grease (viscosity of base oil at 40° C.: 46 mm$^2$/s, mixing consistency: 280), lithium soap/ester oil-based grease (viscosity of base oil at 40° C.: 33 mm$^2$/s, mixing consistency: 250), and urea/ether oil-based grease (viscosity of base oil at 40° C.: 100 mm$^2$/s, mixing consistency: 300).

Further, as an extreme-pressure agent, bismuth or inorganic bismuth was added to the above-described grease at rates shown in table 1 to form grease of each example. On the obtained grease, an extreme-pressure property evaluation test and a test of a roller bearing were conducted. Results are shown in table 1.

Comparison Example 1 Through 8

In a reaction container, as shown in table 2, a thickener was added to base oil, and uniformalizing treatment was performed by using a triple roll mill to obtain lithium soap/mineral oil-based grease (viscosity of base oil at 40° C.: 10 mm$^2$/s, mixing consistency: 220), urea/PAO oil-based grease (viscosity of base oil at 40° C.: 46 mm$^2$/s, mixing consistency: 280), lithium soap/ester oil-based grease (viscosity of base oil at 40° C.: 30 mm²/s, mixing consistency: 250), and urea/ether oil-based grease (viscosity of base oil at 40° C.: 100 mm²/s, mixing consistency: 300).

Further as an extreme-pressure agent, organic bismuth, MoDTC or zinc powder was added to the above-described grease at rates shown in table 2 to form grease of each comparison example.

Similarly to the examples 1 through 11, an extreme-pressure property evaluation test and a test of a roller bearing were conducted. Results are shown in table 2.

Figure 4:
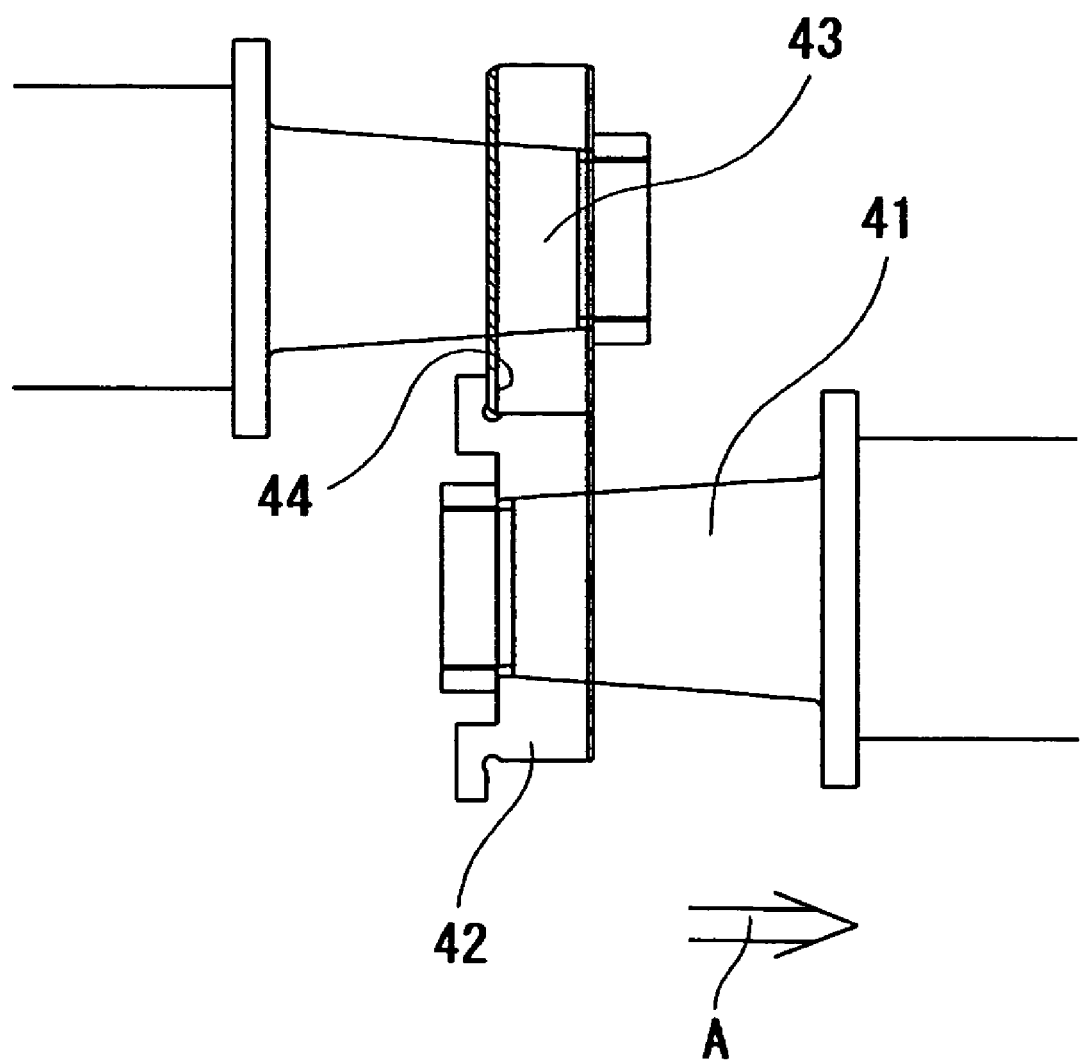
FIG. 4 shows an extreme-pressure property evaluation test apparatus.

Extreme-Pressure Property Evaluation Test:

An extreme-pressure property evaluation test apparatus is shown in FIG. 4. An evaluation test apparatus is constructed of a ring-shaped specimen 42 of φ40×10 fixed to a rotary shaft 41 and a ring-shaped specimen 43 whose end surface is rubbed with an end surface 44 of the specimen 42. The grease for the roller bearing was applied to the end surface 44, and the rotary shaft 41 was rotated at 2000 rpm. An axial load of 490 N in the right-hand direction A in FIG. 4 and a radial load of 392 N were applied to evaluate the extreme-pressure property thereof. The extreme-pressure property was evaluated by measuring vibrations of the rotary shaft 41 generated owing to an increase of the frictional wear of sliding portions of both specimens 42, 43 by a vibration sensor. The test was conducted until the vibration value of the rotary shaft 41 became twice as large as an initial value thereof. The period of time it took for the vibration value thereof to become twice as large as the initial value thereof was measured.

The longer is the period of time it took for the vibration value thereof to become twice as large as the initial value thereof, the larger was the extreme-pressure property effect, and hence excellent resistance to heat and durability are shown. The resistance to heat and durability of the grease of each of the examples and the comparison examples was evaluated by comparing the above-described measured time periods with one another.

Test of Roller Bearing:

3.6 g of grease was enclosed in each of 30206 tapered roller bearings, and the evaluation test apparatus was operated at an axial load of 980 N, 2600 rpm, and a room temperature to measure the temperature of the surface of the flange portion during the rotation thereof. An average value of the temperature of the surface of the flange portion was computed in four to eight hours after the operation of the evaluation test apparatus started.

As sliding friction generated between the flange portion and the "roller" becomes larger, the temperature of the surface of the flange portion during the rotation thereof becomes increasingly high. Therefore the resistance to heat and durability of the grease of each of the examples and the comparison examples was evaluated by comparing above-described measured temperatures with one another. That the above-described measured temperature is not more than 70° C. was set as the standard by which the grease is judged to have resistance to heat and durability.

TABLE 1

| Grease | Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Base grease (wt %) | | | | | | | | | | | |
| Lithium soap/mineral-based grease | 95 | 95 | — | — | 99 | 85 | — | — | 95 | 95 | 95 |
| Urea/PAO oil-based grease | — | — | 95 | 95 | — | — | — | — | — | — | — |
| Lithium soap/ester oil-based grease | — | — | — | — | — | — | 95 | — | — | — | — |
| Urea/ether oil-based grease | — | — | — | — | — | — | — | 95 | — | — | — |
| Extreme-pressure agent (wt %) | | | | | | | | | | | |
| Bismuth sulfate | 5 | — | 5 | — | — | — | 5 | — | — | — | — |
| Bismuth trioxide | — | 5 | — | 5 | 1 | 15 | — | 5 | — | — | — |
| Bismuth powder | — | — | — | — | — | — | — | — | — | — | 5 |
| Organic bismuth compound [1] | — | — | — | — | — | — | — | — | — | — | — |
| Bismuth carbonate | — | — | — | — | — | — | — | — | 5 | — | — |
| Sodium bismuthate | — | — | — | — | — | — | — | — | — | 5 | — |
| MoDTC [2] | — | — | — | — | — | — | — | — | — | — | — |
| Zinc powder | — | — | — | — | — | — | — | — | — | — | — |
| Extreme-pressure property evaluation test(h) | 92 | 140 | 170 | 230 | 86 | 190 | 76 | 88 | 53 | 54 | 300 |
| Test of roller bearing(° C.) | 66 | 64 | 58 | 56 | 68 | 67 | 50 | 70 | 68 | 68 | 55 |

TABLE 2

| Grease | Comparison example | | | | | | | |
|---|---|---|---|---|---|---|---|---|
|  | 1 | 2 | 3 | 4 | 5 | 6 | 7 | 8 |
| Base grease (wt %) | | | | | | | | |
| Lithium soap/mineral-based grease | 100 | — | — | — | 95 | 95 | — | 95 |
| Urea/PAO oil-based grease | — | 100 | — | — | — | — | 95 | — |
| Lithium soap/ester oil-based grease | — | — | 100 | — | — | — | — | — |
| Urea/ether oil-based grease | — | — | — | 100 | — | — | — | — |
| Extreme-pressure agent (wt %) | | | | | | | | |
| Bismuth sulfate | — | — | — | — | — | — | — | — |
| Bismuth trioxide | — | — | — | — | — | — | — | — |
| Bismuth powder | — | — | — | — | — | — | — | — |

TABLE 2-continued

| | | | | | | | | |
|---|---|---|---|---|---|---|---|---|
| Organic bismuth compound[1] | — | — | — | — | 5 | — | 5 | — |
| Bismuth carbonate | — | — | — | — | — | — | — | — |
| Sodium bismuthate | — | — | — | — | — | — | — | — |
| MoDTC[2] | — | — | — | — | — | 5 | — | — |
| Zinc powder | — | — | — | — | — | — | — | 5 |
| Extreme-pressure property evaluation test(h) | 16 | 39 | 6 | 14 | 54 | 16 | 62 | 20 |
| Test of roller bearing(° C.) | 85 | 74 | 48 | 72 | 82 | 90 | 73 | 34 |

[1]Bismuth subgallate

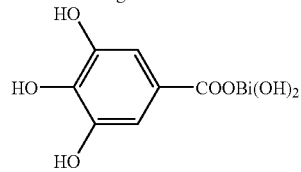

Molybdenum dithiocarbamate
[2]Molyvan A (Vanderbilt Company, Inc.)

Comparing data of the lithium soap/mineral oil-based grease of the examples and the comparison examples shown in tables 1 and 2 with one another, in terms of the kind of the extreme-pressure agent, the bismuth or the inorganic bismuth was superior to the organic bismuth in the resistance to heat and the durability in the extreme-pressure property evaluation test and the test of the roller bearing.

As shown in the example 11 and the comparison example 5, the bismuth powder has the resistance to heat and durability about six times as large as those of the organic bismuth. As shown in the example 2 and the comparison example 5, the bismuth trioxide has the resistance to heat and durability about three times as large as those of the organic bismuth. From these results, it is considered that the bismuth or the inorganic bismuth is superior to the organic bismuth in the resistance to heat and the durability, less heat-decomposable than the organic bismuth, and hence capable of keeping the extreme-pressure property effect for a long time.

In the bismuth sulfate, the bismuth trioxide, and the bismuth powder, the bismuth powder showed the most favorable resistance to heat and durability.

As the addition amount of the bismuth trioxide increases from 1 wt % of the example 5 to 5 wt % of the example 2 and to 15 wt % of the example 6, there is a tendency that the extreme-pressure property effect increases. But even though the addition amount of the bismuth trioxide increases to 15 wt % three times as large as the addition amount of 5 wt %, the increase of the extreme-pressure property effect is about 1.4 times. This is considered that when the addition amount of the bismuth trioxide approaches 15 wt %, there is a tendency that the torque at the time of the rotation is high and thus the generation of heat increases and the rotation is interfered.

As shown in the comparison example 8, when the zinc powder is added to the grease, the resistance to heat and durability of the grease deteriorate considerably. Although the zinc powder is an inorganic compound, no extreme-pressure property effect was admitted in the zinc powder. This is considered that because the melting point of zinc is low, the resistance of the grease to heat could not be improved.

Data of the urea/PAO oil-based grease, the lithium soap/ester oil-based grease, and the urea/ether oil-based grease of the examples and the comparison examples shown in tables 1 and 2 were compared with one another. In the case of the urea/PAO oil-based grease, in terms of the kind of the extreme-pressure agent, the inorganic bismuth such as the bismuth sulfate and the bismuth trioxide was superior to the organic bismuth in the resistance to heat and durability thereof. As shown in the examples 3, 4 and the comparison example 7, the bismuth trioxide had resistance to heat and durability about three times as large as those of the organic bismuth, and the bismuth trioxide had resistance to heat and durability about four times as large as those of the organic bismuth. This is considered that the inorganic bismuth is superior to the organic bismuth in the resistance to heat and durability thereof, less heat-decomposable than the organic bismuth, and hence capable of keeping the extreme-pressure property effect for a long time.

As shown in the example 7 and the comparison example 3, the lithium soap/ester oil-based grease containing the bismuth sulfate as the extreme-pressure agent had resistance to heat and durability about 13 times as large as those of the ester oil-based grease not containing the extreme-pressure agent.

As shown in the example 8 and the comparison example 4, the urea/ether oil-based grease containing the bismuth trioxide as the extreme-pressure agent, the urea/ether oil-based grease had resistance to heat and durability about six times as large as those of the urea/ether oil-based grease not containing the extreme-pressure agent. From these results, it is understood that the inorganic bismuth such as the bismuth sulfate and the bismuth trioxide is capable of keeping the extreme-pressure property effect for a long time.

Example 12

A copper plate (SUJ2, thickness: 10 mm) and a ring-shaped specimen (SUJ2) of φ40 mm×thickness of 10 mm were immersed in a solution containing 5 g of the bismuth trioxide (produced by Wako Pure Chemical Industries, Ltd.) and 95 g of PAO oil (SYNFLUID 801 produced by Nippon Steel Chemical Co., Ltd.) to which the bismuth trioxide was added. The ring-shaped specimen was rotated at 2000 rpm for 20 hours with an end surface of the ring-shaped specimen pressed against the copper plate at a load of 490 N. By frictional heat generated at that time, a coating film of the bismuth trioxide was formed on the end surface of the ring-shaped specimen. The formation of the coating film of the bismuth trioxide on the end surface of the ring-shaped specimen was confirmed by surface analysis performed by means of Photoemission Spectroscopy (hereinafter referred to as XPS).

Figure 14:
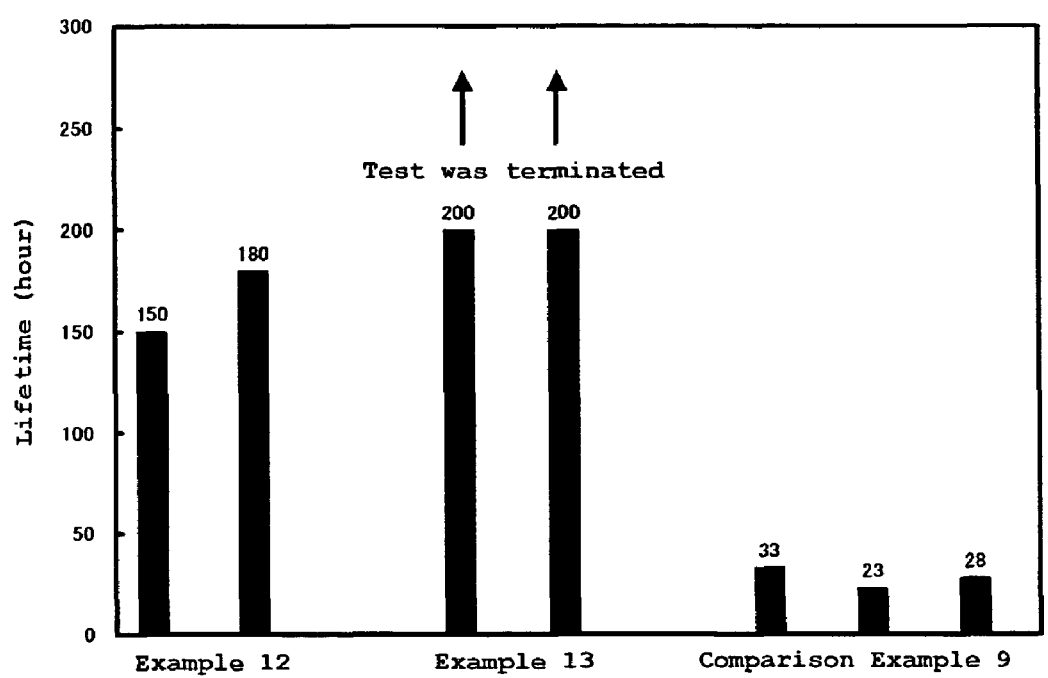
FIG. 14 shows results of an extreme-pressure property evaluation test.

By using two ring-shaped specimens, an extreme-pressure property evaluation test shown below was conducted. Results are shown in FIG. 14.

Example 13

The copper plate (SUJ2, thickness: 10 mm) and the ring-shaped specimen (SUJ2) of φ40 mm×thickness: 10 mm were immersed in a solution containing 5 g of bismuth (produced by Wako Pure Chemical Industries, Ltd.)and 95 g of the PAO oil (SYNFLUID 801 produced by Nippon Steel Chemical Co., Ltd.) to which the bismuth was added. The ring-shaped specimen was rotated at 2000 rpm for 20 hours with the end surface of the ring-shaped specimen pressed against the copper plate at a load of 490 N. By frictional heat generated at that time, a coating film of the bismuth was formed on the end surface of the ring-shaped specimen. The formation of the coating film of the bismuth on the end surface of the ring-shaped specimen was confirmed by the surface analysis performed by means of the XPS.

By forming two ring-shaped specimens, an extreme-pressure property evaluation test shown below was conducted. Results are shown in FIG. 14.

Comparison Example 9

By using three ring-shaped specimens on which the coating film of the bismuth or the film of the bismuth compound was not formed, an extreme-pressure property evaluation test was conducted. Results are shown in FIG. 14. The materials and configurations of the ring-shaped specimens were identical to those of the example 12.

Example 14

Figure 15:
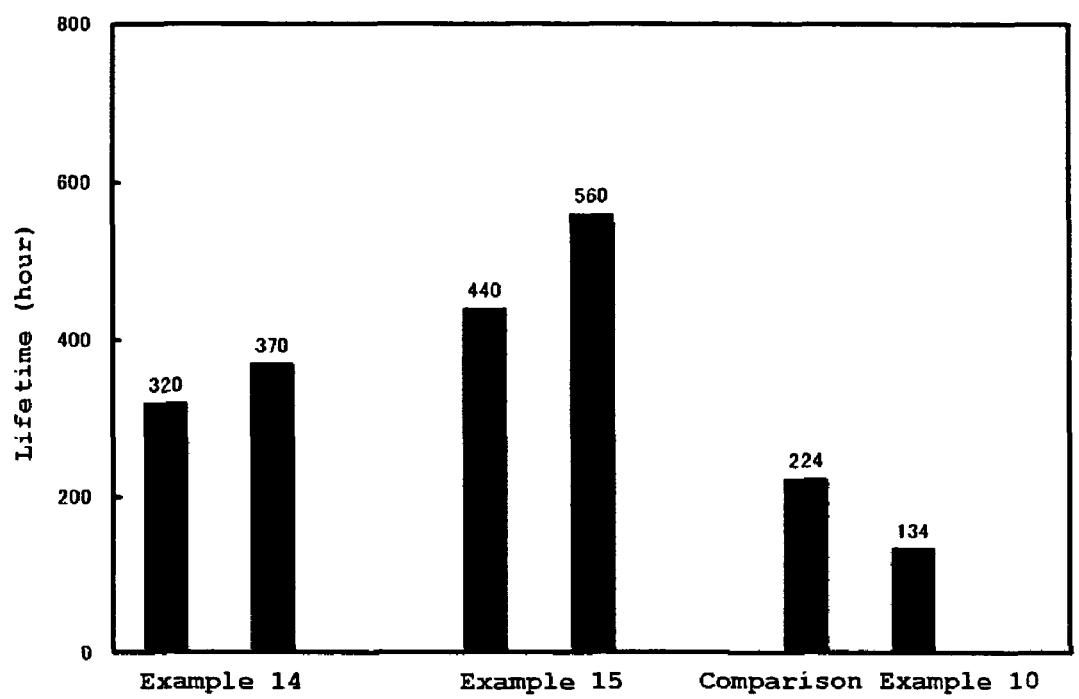
FIG. 15 shows results of durability test of a rolling bearing.

A 30204 tapered roller bearing was rotated in a solution containing 5 g of the bismuth trioxide (produced by Wako Pure Chemical Industries, Ltd.) and 95 g of the PAO oil (SYNFLUID 801 produced by Nippon Steel Chemical Co., Ltd.) to which the bismuth trioxide was added. Each 30204 tapered roller bearing was rotated at an axial load of 980 N and 2600 rpm for eight hours to form the coating film of the bismuth trioxide on the rolling surface of the 30204 tapered roller bearing. Two 30204 tapered roller bearings were used and cleaned and a durability test of the rolling bearing shown below was conducted. Results are shown in FIG. 15.

Example 15

The 30204 tapered roller bearing was rotated in a solution containing 5 g of bismuth (produced by Wako Pure Chemical Industries, Ltd.) and 95 g of the PAO oil (SYNFLUID 801 produced by Nippon Steel Chemical Co., Ltd.) to which the bismuth was added. The 30204 tapered roller bearing was rotated at an axial load of 980 N and 2600 rpm for eight hours to form the coating film of the bismuth on the surface of the 30204 tapered roller bearing. Two 30204 tapered roller bearings were used and cleaned, and a durability test of the rolling bearing shown below was conducted. Results are shown in FIG. 15.

Comparison Example 10

By using two 30204 tapered roller bearings on which the coating film of the bismuth or the bismuth compound was not formed, a durability test of the rolling bearing was conducted. Results are shown in FIG. 15.

Durability Test of Rolling Bearing:

1.8 g of the lithium soap/mineral oil-based grease (ARAPEN RB300 produced by Exxon Mobil Corporation) was enclosed in the 30204 tapered roller bearing. The tapered roller bearing was rotated at a temperature of 120° C., and 5000 rpm, with an axial load of 67 N and a radial load of 67 N applied thereto. The period of time (life period of time) required for the rotational torque of the bearing to increase not less than twice as large as an initial rotational torque thereof was measured. The durability of the rolling bearing of each of the examples 14, 15 and the comparison example 10 was evaluated by comparing the above-described measured time periods with one another.

In FIG. 14 showing the extreme-pressure property evaluation test, the life of the specimen of the comparison example 9 on which the coating film of the bismuth or the like was not formed was 28 hours on the average, whereas the life of the specimen of the example 12 on which the coating film of the bismuth trioxide was formed was 165 hours on the average which was 5.9 times as large as the life of the specimen of the comparison example 9. Similarly as compared with the life of the specimen of the comparison example 9, in the specimen of the example 13 on which the coating film of the bismuth was formed, the vibration values of the two specimens did not increase twice as large as the initial vibration value even over 200 hours, and the extreme-pressure property evaluation test was terminated. Thus on the average, the specimens of the example 13 showed an extreme-pressure property effect considerably exceeding 7.1 times that of the specimen of the comparison example 9.

These results indicate that by forming the coating film of the bismuth or the like, metal contact of the sliding portion is prevented and the extreme-pressure property effect was displayed. Further it is considered that of the coating films of the bismuth and the like, the coating film of the bismuth is superior to that of the bismuth trioxide in the long-term durability thereof. Thus the coating film of the bismuth has a larger extreme-pressure property effect than the bismuth trioxide.

In FIG. 15 showing the results of the durability test of the rolling bearing, the life of the specimen of the comparison example 10 on which the coating film of the bismuth or the bismuth compound was not formed was 179 hours on the average, whereas the life of the specimen of the example 14 on which the coating film of the bismuth trioxide was formed was 345 hours on the average which was 3.9 times the life of the specimen of the comparison example 10. Similarly as compared with the life of the specimen of the comparison example 10, the specimen of the example 15 on which the coating film of the bismuth was formed had a life of 500 hours on the average. Thus the specimen of the example 15 showed durability 5.6 times as large as that of the comparison example 10.

These results indicate that by forming the coating film of the bismuth or the like, metal contact at the flange portion of the roller bearing is prevented and the extreme-pressure property effect was displayed. Further it is considered that of the coating films of the bismuth and the like, the coating film of the bismuth is superior to that of the bismuth trioxide in the long-term durability thereof, because the coating film of the bismuth preventing the metal contact at the flange portion of the roller bearing is stably present.

INDUSTRIAL APPLICABILITY

Because the inorganic bismuth excellent in the resistance to heat and durability is used for the grease, rolling bearing, constant velocity joint, and rolling parts of the present invention, the extreme-pressure property effect can be kept for a long time. Therefore the grease, rolling bearing, constant velocity joint, and rolling parts of the present invention can be preferably utilized for airplanes, rolling stocks, building machines, electric auxiliary machines of cars, hubs of cars, and wind power generators and the like demanded to have resistance to wear and long-term durability.

The invention claimed is:

1. A grease for use in a rolling bearing comprising a base grease and an additive, wherein the base grease comprises a base oil and a thickener, said base oil is one oil selected from among poly-α-olefin oil, mineral oil, and ether oil, said base oil having a kinematic viscosity of 33 to 100 mm$^2$/s at 40° C. and the additive comprises sodium bismuthate.

2. A grease for use in a rolling bearing comprising a base grease and an additive, wherein the base grease comprises a base oil and a thickener, said base oil is one oil selected from among poly-α-olefin oil, mineral oil, and ether oil, said base oil having a kinematic viscosity of 20 to 200 mm$^2$/s at 40° C. and the additive comprises sodium bismuthate.

3. The grease as defined in claim 2 where the rolling bearing is in a rolling stock.

* * * * *